(12) United States Patent  (10) Patent No.: US 8,437,990 B2
Rodriguez et al.  (45) Date of Patent: May 7, 2013

(54) GENERATING A SIMULATED FLUID FLOW OVER AN AIRCRAFT SURFACE USING ANISOTROPIC DIFFUSION

(75) Inventors: David L. Rodriguez, Palo Alto, CA (US); Peter Sturdza, Redwood City, CA (US)

(73) Assignee: Aerion Corporation, Reno, NV (US)

( * ) Notice: Subject to any disclaimer, the term of this patent is extended or adjusted under 35 U.S.C. 154(b) by 244 days.

(21) Appl. No.: 13/046,469

(22) Filed: Mar. 11, 2011

(65) Prior Publication Data

US 2012/0232860 A1    Sep. 13, 2012

(51) Int. Cl.
G06F 17/10   (2006.01)

(52) U.S. Cl.
USPC ............................................................. 703/2

(58) Field of Classification Search ......................... 703/2
See application file for complete search history.

(56) References Cited

U.S. PATENT DOCUMENTS

| | | | |
|---|---|---|---|
| 5,544,524 | A | 8/1996 | Huyer et al. |
| 6,516,652 | B1 | 2/2003 | May et al. |
| 7,054,768 | B2 | 5/2006 | Anderson |
| 7,251,592 | B1 | 7/2007 | Praisner et al. |
| 2006/0025973 | A1 | 2/2006 | Kim |
| 2007/0034746 | A1 | 2/2007 | Shmilovich et al. |
| 2008/0177511 | A1 | 7/2008 | Kamatsuchi |
| 2008/0300835 | A1 | 12/2008 | Hixon |
| 2009/0171596 | A1 | 7/2009 | Houston |
| 2009/0171633 | A1 | 7/2009 | Aparicio Duran et al. |
| 2009/0234595 | A1 | 9/2009 | Okcay et al. |
| 2009/0312990 | A1 | 12/2009 | Fouce et al. |
| 2010/0036648 | A1 | 2/2010 | Mangalam et al. |
| 2010/0250205 | A1 | 9/2010 | Velazquez Lopez et al. |
| 2010/0268517 | A1 | 10/2010 | Calmels |
| 2010/0280802 | A1 | 11/2010 | Calmels |
| 2010/0305925 | A1 | 12/2010 | Sendhoff et al. |

OTHER PUBLICATIONS

Neal T. Frink, "An unstructured-grid software system for solving complex aerodynamic problems," 1995, NASA, pp. 1-20.*
Dennis O. Allison et al., "Static aeroelastic predictions for a transonic transport model using an unstructured-grid flow solver coupled with a structural plate technique," 2003, NASA, pp. 1-42.*

(Continued)

*Primary Examiner* — Dwin M Craig
*Assistant Examiner* — Russ Guill
(74) *Attorney, Agent, or Firm* — Morrison & Foerster LLP

(57) ABSTRACT

A fluid-flow simulation over a computer-generated aircraft surface is generated using a diffusion technique. The surface is comprised of a surface mesh of polygons. A boundary-layer fluid property is obtained for a subset of the polygons of the surface mesh. A pressure-gradient vector is determined for a selected polygon, the selected polygon belonging to the surface mesh but not one of the subset of polygons. A maximum and minimum diffusion rate is determined along directions determined using a pressure gradient vector corresponding to the selected polygon. A diffusion-path vector is defined between a point in the selected polygon and a neighboring point in a neighboring polygon. An updated fluid property is determined for the selected polygon using a variable diffusion rate, the variable diffusion rate based on the minimum diffusion rate, maximum diffusion rate, and angular difference between the diffusion-path vector and the pressure-gradient vector.

20 Claims, 12 Drawing Sheets

OTHER PUBLICATIONS

Dimitri J. Mavriplis, "Aerodynamic drag prediction using unstructured mesh solvers," 2003, downloaded from http://wwweng.uwyo.edu/mechanical/faculty/Dimitri_Mavriplis/HOME/TALKS/vki.mavriplis.pdf, pp. 1-83.*

Richard S. Smith et al., "Interpolation and gridding of aliased geophysical data using constrained anisotropic diffusion to enhance trends," 2004, SEG International Exposition and 74th Annual Meeting, four pages.*

Joachim Weickert et al., "Tensor field interpolation with PDEs," 2005, Universitat des Saarlandes, pp. 1-14.*

David L. Rodriguez et al., "Improving the accuracy of Euler/Boundary-layer solvers with anisotropic diffusion," 2012, downloaded from www.desktop.aero/publications/AIAA-2012-0304.pdf, pp. 1-15.*

David L. Rodriguez et al., "A rapid, robust, and accurate coupled boundary-layer method for Cart3D," 2012, downloaded from www.desktop.aero/publications/AIAA-2012-0302.pdf, pp. 1-15.*

Non Final Office Action received for U.S. Appl. No. 12/962,744, mailed on Oct. 2, 2012, 21 pages.

Crouch et al., "Transition Prediction for Three-Dimensional Boundary Layers in Computational Fluid Dynamics Applications", AIAA Journal, vol. 40, No. 8, Aug. 2002, pp. 1536-1541.

Dagenhart, J. Ray, "Amplified Crossflow Disturbances in the Laminar Boundary Layer on Swept Wings with Suction", NASA Technical Paper 1902, Nov. 1981, 91 pages.

Drela, Mark, "Implicit Implementation of the Full en Transition Criterion", American Institute of Aeronautics and Astronautics Paper 03-4066, Jun. 23-26, 2003, pp. 1-8.

Drela, Mark, "Two-Dimensional Transonic Aerodynamic Design and Analysis Using the Euler Equations", Ph.D. thesis, Massachusetts Institute of Technology, Dec. 1985, pp. 1-159.

Fuller et al., "Neural Network Estimation of Disturbance Growth Using a Linear Stability Numerical Model", American Institute of Aeronautics and Astronautics, Inc., Jan. 6-9, 1997, pp. 1-9.

Gaster, M., "Rapid Estimation of N-Factors for Transition Prediction", 13th Australasian Fluid Mechanics Conference, Dec. 13-18, 1998, pp. 841-844.

Gleyzes et al., "A Calculation Method of Leading-Edge Separation Bubbles", Numerical and Physical Aspects of Aerodynamic Flows II, 1984, pp. 173-192.

Krumbein, Andreas, "Automatic Transition Prediction and Application to Three-Dimensional Wing Configurations", Journal of Aircraft, vol. 44, No. 1, Jan.-Feb. 2007, pp. 119-133.

Langlois et al., "Automated Method for Transition Prediction on Wings in Transonic Flows", Journal of Aircraft, vol. 39, No. 3, May-Jun. 2002, pp. 460-468.

Perraud et al., "Automatic Transition Predictions Using Simplified Methods", AIAA Journal, vol. 47, No. 11, Nov. 2009, pp. 2676-2684.

Rasmussen et al., "Gaussian Processes for Machine Learning", MIT Press, 2006, 266 pages.

Stock et al., "A Simplified en Method for Transition Prediction in Two-Dimensional, Incompressible Boundary Layers", Journal of Flight Sciences and Space Research, vol. 13, 1989, pp. 16-30.

Sturdza, Peter, "An Aerodynamic Design Method for Supersonic Natural Laminar Flow Aircraft", Stanford University, Dec. 2003, 198 pages.

Washburn, Anthony, "Drag Reduction Status and Plans—Laminar Flow and AFC", AIAA Aero Sciences Meeting, Jan. 4-7, 2011, pp. 1-25.

Lock et al., "Viscous-Inviscid Interactions in External Aerodynamics", Progress in Aerospace Sciences, vol. 24, 1987, pp. 51-171.

Aftosmis et al., "Applications of a Cartesian Mesh Boundary-Layer Approach for Complex Configurations", 44th AIAA Aerospace Sciences Meeting, Reno NV, Jan. 9-12, 2006, pp. 1-19.

Jespersen et al., "Recent Enhancements to Overflow", AIAA 97-0644, 1997, pp. 1-17.

Drela, Mark, "XFOIL: An Analysis and Design System for Low Reynolds Number Airfoils", Proceedings of the Conference on Low Reynolds Number Aerodynamics, 1989, pp. 1-12.

Bartels et al., "CFL3D Version 6.4—General Usage and Aeroelastic Analysis", NASA/TM-2006-214301, Apr. 2006, 269 pages.

Eymard et al., "Discretization Schemes for Heterogeneous and Anisotropic Diffusion Problems on General Nonconforming Meshes", Available online as HAL report 00203269, Jan. 22, 2008, pp. 1-28.

Balay et al., "PETSc Users Manual", ANL-95/11, Revision 3.1, Mar. 2010, pp. 1-189.

Spreiter et al., "Thin Airfoil Theory Based on Approximate Solution of the Transonic Flow Equation", Report 1359—National Advisory Committee for Aeronautics, 1957, pp. 509-545.

Hess et al., "Calculation of Potential Flow About Arbitrary Bodies", Progress in Aerospace Sciences, 1967, pp. 1-138.

Lewis, R. I., "Vortex Element Methods for Fluid Dynamic Analysis of Engineering Systems", Cambridge University Press, 2005, 12 pages.

Drela et al., "Viscous-inviscid Analysis of Transonic and Low Reynolds Number Airfoils", AIAA Journal, vol. 25, No. 10, Oct. 1987, pp. 1347-1355.

Veldman, Arthur E. P., "New, Quasi-Simultaneous Method to Calculate Interacting Boundary Layers", AIAA Journal, vol. 19, No. 1, Jan. 1981, pp. 79-85.

Veldman et al., "The Inclusion of Streamline Curvature in a Quasi-Simultaneous Viscous-Inviscid Interaction Method for Transonic Airfoil Flow", Department of Mathematics, University of Groningen, Nov. 10, 1998, pp. 1-18.

Cebeci et al., "VISCID/INVISCID Separated Flows", AFWAL-TR-86-3048, Jul. 1986, 95 pages.

Carter, James E., "A New Boundary-Layer Inviscid Iteration Technique for Separated Flow", AIAA 79-1450, 1979, pp. 45-55.

Potsdam, Mark A., "An Unstructured Mesh Euler and Interactive Boundary Layer Method for Complex Configurations", AIAA-94-1844, Jun. 20-23, 1994, pp. 1-8.

Veldman, Arthur E. P., "Strong Viscous-Inviscid Interaction and the Effects of Streamline Curvature", CWI Quarterly, vol. 10 (3&4), 1997, pp. 353-359.

Veldman, Arthur E. P., "A Simple Interaction Law for Viscous—Inviscid Interaction", Journal of Engineering Mathematics, vol. 65, 2009, pp. 367-383.

Coenen et al., "Quasi-Simultaneous Viscous-Inviscid Interaction for Three-Dimensional Turbulent Wing Flow", IDAS 2000 Congress, 2000, pp. 731.1-731.10.

Veldman, Arthur E. P., "Quasi-Simultaneous Viscous-Inviscid Interaction for Transonic Airfoil Flow", American Institute of Aeronautics and Astronautics Paper 2005-4801, 2005, pp. 1-13.

International Search Report and Written Opinion received for PCT Patent Application No. PCT/US2011/67917, mailed on May 1, 2012, 10 pages.

International Search Report and Written Opinion received for PCT Patent Application No. PCT/US2012/28606, mailed on Jun. 1, 2012, 11 pages.

International Search Report and Written Opinion received for PCT Patent Application No, PCT/US2012/030427, mailed on Jun. 20, 2012, 9 pages.

International Search Report and Written Opinion received for PCT Patent Application No. PCT/US2012/030189, mailed on Jun. 20, 2012, 7 pages.

* cited by examiner

GENERATING A SIMULATED FLUID FLOW OVER AN AIRCRAFT SURFACE USING ANISOTROPIC DIFFUSION

STATEMENT REGARDING FEDERALLY SPONSORED RESEARCH OR DEVELOPMENT

This invention was made with Government support under contract NNL08AA08C awarded by NASA. The Government has certain rights in the invention.

BACKGROUND

1. Field

This application relates generally to simulating a fluid flow over a computer-generated aircraft surface and, more specifically, to estimating a viscous fluid property distribution over a computer-generated aircraft surface using an anisotropic diffusion technique.

2. Description of the Related Art

Aerodynamic analysis of an aircraft moving through a fluid typically requires an accurate prediction of the properties of the fluid surrounding the aircraft. Accurate aerodynamic analysis is particularly important when designing aircraft surfaces, such as the surface of a wing or control surface. Typically, the outer surface of a portion of the aircraft, such as the surface of a wing, is modeled, either physically or by computer model, so that a simulation of the fluid flow can be performed and properties of the simulated fluid flow can be measured. Fluid-flow properties are used to predict the characteristics of the wing including lift, drag, boundary-layer velocity profiles, and pressure distribution. The flow properties may also be used to map laminar and turbulent flow regions near the surface of the wing and to predict the formation of shock waves in transonic and supersonic flow.

A computer-generated simulation can be performed on a computer-generated aircraft surface to simulate the fluid dynamics of a surrounding fluid flow. The geometry of the computer-generated aircraft surface is relatively easy to change and allows for optimization through design iteration or analysis of multiple design alternatives. A computer-generated simulation can also be used to study situations that may be difficult to reproduce using a physical model, such as supersonic flight conditions. A computer-generated simulation also allows a designer to measure or predict fluid-flow properties at virtually any point in the model by direct query, without the difficulties associated with physical instrumentation or data acquisition techniques.

In some cases, a computer-generated simulation includes a computational fluid dynamics (CFD) simulation module used to predict the properties of the fluid flow. A CFD simulation module estimates the properties of a simulated fluid flow by applying an algorithm or field equation that estimates the interaction between small simulated fluid volumes, also referred to as fluid cells. Because a single CFD simulation module may include millions of individual fluid cells, the complexity of the relationship between fluid cells can have a large effect on the computational efficiency of the simulation. Complex CFD simulation modules can be computationally expensive and require hours or even days to execute using high-performance computer processing hardware.

To reduce the computational burden, in some instances it is desirable to use a CFD simulation module that simplifies the fluid dynamics and produces a fluid simulation that can be solved more rapidly. For example, for fluid flows that are relatively uniform or are located away from an aircraft surface, a simplified simulation that minimizes or ignores certain fluid dynamic phenomena can be used. In the examples discussed below, a simplified simulation may ignore fluid dynamic contributions due to fluid viscosity, which, in some cases, have little effect on the overall behavior of the fluid. By using a simplified simulation, processing time may be improved.

In other situations, where the fluid flow is not as uniform, it may be necessary to use a CFD simulation module that is more sophisticated and capable of accurately predicting the fluid properties, using more complex fluid dynamics. In the examples discussed below, a more sophisticated simulation may account for dynamic contributions due to fluid viscosity. Under certain conditions, the more sophisticated simulation may be more accurate, particularly for portions of the fluid flow where fluid viscosity affects the results. However, more sophisticated simulation modules are also likely to require more computing resources, and therefore may require more time to solve.

SUMMARY

One exemplary embodiment includes a computer-implemented method of generating a fluid-flow simulation over a computer-generated aircraft surface. The surface is comprised of a surface mesh of polygons. A boundary-layer fluid property is obtained for a subset of the polygons of the surface mesh of polygons. The subset represents a portion of the computer-generated aircraft surface. A pressure-gradient vector is determined for a selected polygon, the selected polygon belonging to the surface mesh of polygons but not one of the subset of polygons for which a boundary-layer fluid property has been obtained. A minimum diffusion rate is defined along the direction of the pressure gradient vector of the selected polygon. A maximum diffusion rate is also defined in a direction perpendicular to the direction of the pressure gradient vector of the selected polygon. A diffusion-path vector is defined between a point in the selected polygon and a neighboring point in a neighboring polygon, the neighboring polygon belonging to the subset of polygons for which a boundary-layer fluid property has been obtained. An updated fluid property is determined for the selected polygon using a variable diffusion rate, the variable diffusion rate based on the minimum diffusion rate, maximum diffusion rate, and angular difference between the diffusion-path vector and the pressure gradient vector.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION

Figure 1:
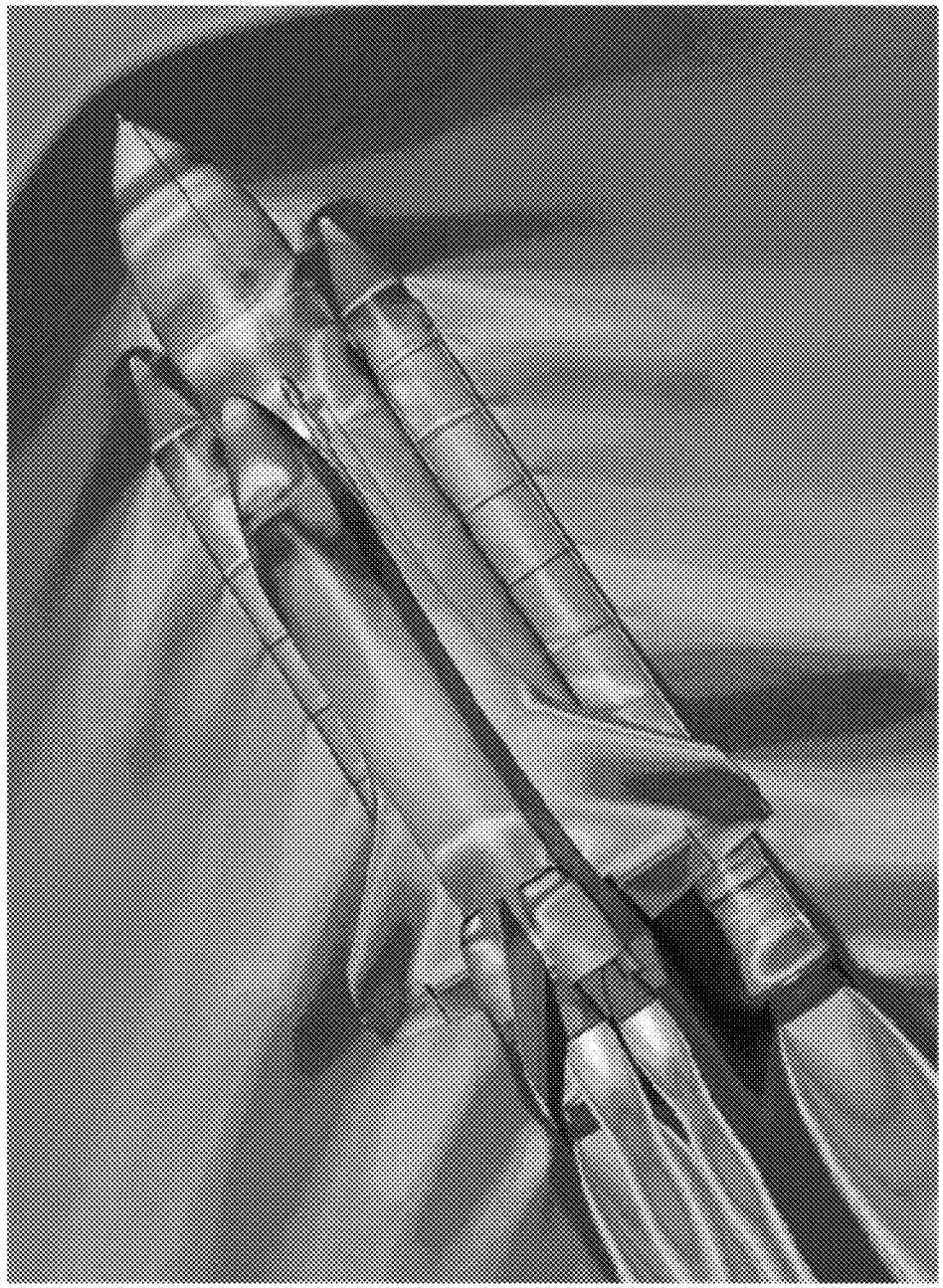
FIG. 1 depicts a computer-generated fluid flow applied to a computer-generated aircraft surface.

As discussed above, a computer-generated simulation can be used to analyze the aerodynamic performance of a proposed aircraft surface, such as a wing or control surface. Using known geometry modeling techniques, a computer-generated aircraft surface that represents the outside surface of the proposed aircraft can be constructed. FIG. 1 depicts an exemplary computer-generated aircraft surface of the Space Shuttle orbiter vehicle, external tank, and twin solid-fuel rocket boosters. A CFD simulation module has been applied using the computer-generated aircraft surface of the Space Shuttle orbiter to predict the fluid properties of an exemplary fluid flow.

As shown in FIG. 1, the results of the simulation can be visually represented as shaded regions on the computer-generated aircraft surface of the Space Shuttle. Different shades represent the predicted pressure distribution resulting from the simulated fluid flow. In FIG. 1, transitions between the shaded regions represent locations of predicted pressure change across the surface of the Space Shuttle. Similarly, different pressures in the surrounding fluid flow are represented as differently shaded regions.

In FIG. 1, the simulation of the fluid flow is visualized by depicting the predicted pressure distribution. However, the simulation may be visualized using other fluid properties, including surface velocity, air temperature, air density, and others. Additionally, the simulation may be used to visualize locations of developing shock waves or transitions between laminar and turbulent flow.

The simulation allows the designer or engineer to evaluate the performance of the aircraft geometry for various flow conditions. If necessary, changes can be made to the aircraft geometry to optimize performance or eliminate an unwanted aerodynamic characteristic. Another simulation can be performed using the modified geometry, and the results can be compared. To allow for multiple design iterations, it is advantageous to perform multiple simulations in a short amount of time. However, as described above, there is a trade-off between speed and accuracy of the simulation depending on the type of CFD simulation module used.

As mentioned above, a computer-generated simulation typically represents a fluid flow as a three-dimensional fluid-flow mesh of small volumes of fluid called fluid cells. The shape of the fluid cells can vary depending on the type of fluid-flow mesh used. A CFD simulation module predicts the fluidic interactions between the fluid cells in the fluid-flow mesh, using a fundamental algorithm or field equation.

The speed and accuracy of a CFD simulation module depends, in part, on the field equation used to predict the interaction between the fluid cells. In some instances, the field equation simplifies the relationship between fluid cells by ignoring or minimizing certain dynamic contributions. These field equations are typically less complex, and therefore are more computationally efficient. For instance, a simplified algorithm called the Euler method may be used to simulate a fluid flow when viscous effects can be minimized or ignored. Viscous effects of a fluid can be ignored when, for example, there is not a significant velocity difference between adjacent fluid cells, and therefore shear forces due to internal friction or viscosity are minimal. A CFD simulation module that ignores or minimizes effects of fluid viscosity can also be referred to as an inviscid simulation.

In other instances, a more complex field equation is used to more accurately predict the interaction between the fluid cells. For example, a Navier-Stokes method can be used to simulate the pressure and shear forces on the fluid cells. Unlike the Euler method mentioned above, the Navier-Stokes method accounts for the effects of viscosity and offers a more accurate simulation of a fluid flow. A simulated fluid flow that accounts for effects due to fluid viscosity can also be referred to as a viscous simulation.

However, the improved accuracy of the Navier-Stokes method comes at the cost of increased computational load, and therefore the Navier-Stokes method is generally slower to compute than an Euler-based algorithm. In addition, a Navier-Stokes method may require more (smaller) fluid cells to generate acceptable results, further increasing the computational load. Thus, selecting the field equation for a CFD module often involves a trade-off between speed and accuracy. In practice, designers may use faster Euler-based CFD models to evaluate multiple design iterations and then validate the final design iteration with a more accurate Navier-Stokes-based CFD model. However, if the Navier-Stokes CFD simulation reveals a design problem, the entire process must be repeated, wasting valuable time and computing resources.

The techniques described below are computer-generated simulations that use both viscous and inviscid field equations to achieve acceptable accuracy without requiring the computational burden of a full viscous CFD simulation (e.g., a Navier-Stokes-based CFD simulation). In many simulations, there is a region of the fluid flow that can be accurately predicted without taking viscous contributions into account. For example, regions of the fluid flow that are located away from an aircraft or wing surface have a relatively uniform velocity profile. Therefore, an inviscid simulation using, for example, an Euler-based analysis, can be used to accurately predict the behavior of the fluid-flow region. In other fluid-flow regions where there is a less uniform velocity profile, a more complex, viscous simulation can be used.

Figure 4:
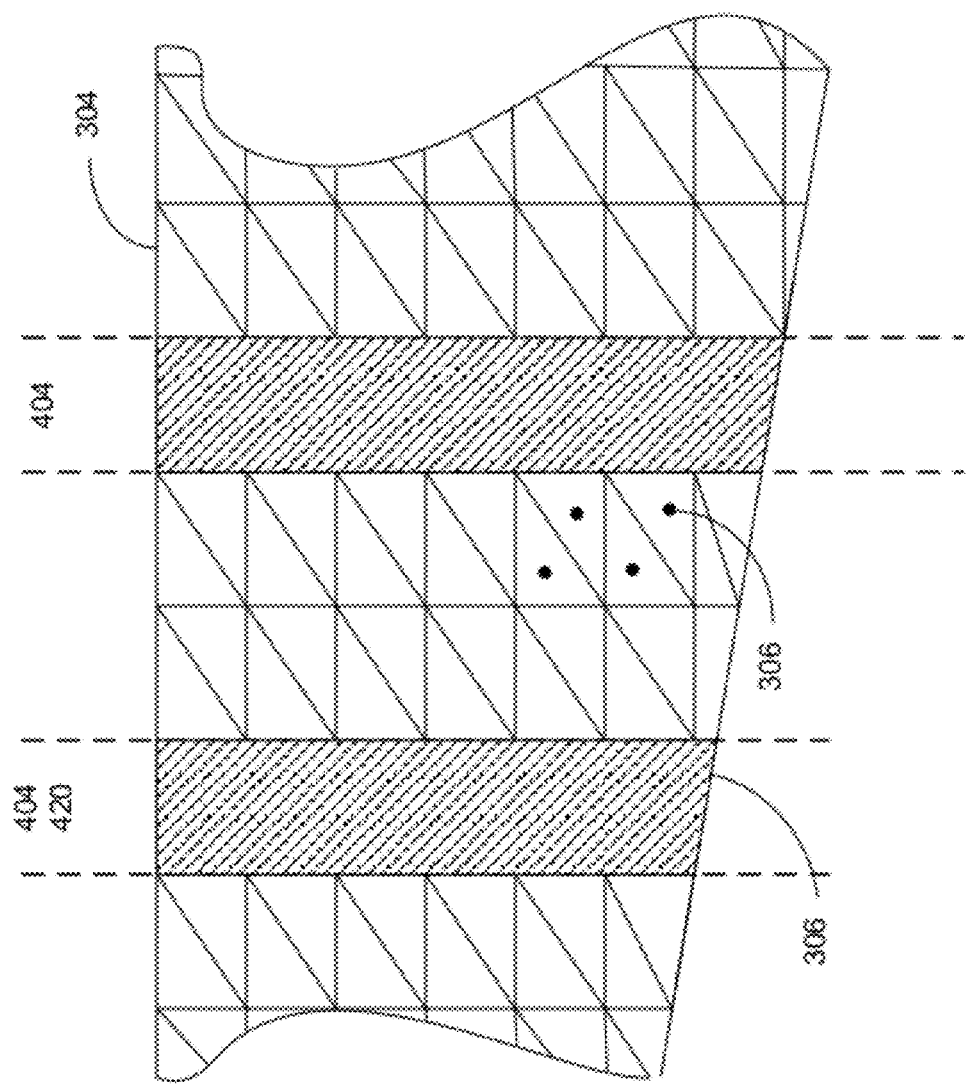
FIG. 4 depicts a surface mesh of polygons representing a wing surface and strip areas representing a portion of wing surface.

In fluid-flow regions where a viscous simulation is desired, further computational gains can be realized by performing the viscous simulation for only a portion of the fluid-flow region. For example, a portion of a boundary-layer fluid-flow region (near a wing surface) may be represented by one or more strip areas. See, for example FIG. 4, depicting strip areas 404 extending along the chord direction of the wing and spaced at intervals along the span of the wing. In FIG. 4, the strip areas 404 are spaced at regular intervals; however, it is not necessary that they be so. The viscous simulation is performed only for the strip-area portions of the boundary-layer fluid-flow region, thereby reducing the number of simulation calculations. As a result, the boundary-layer fluid properties are only known for strip-area portions of the boundary-layer fluid-flow region.

Using the techniques described below, the predicted boundary-layer fluid properties for a portion of a boundary-layer region (represented by, for example, strip areas 404) can be extended to the other portions of the boundary-layer region. Specifically, a diffusion technique can be used to propagate a predicted boundary-layer fluid property for the strip areas 404 to other areas of the computer-generated aircraft surface, between the strip areas 404. In this way, the techniques described herein may provide an accurate prediction of the fluid properties of an entire fluid-flow region without having to perform a CFD simulation for the entire boundary-layer fluid-flow region.

Figure 2:
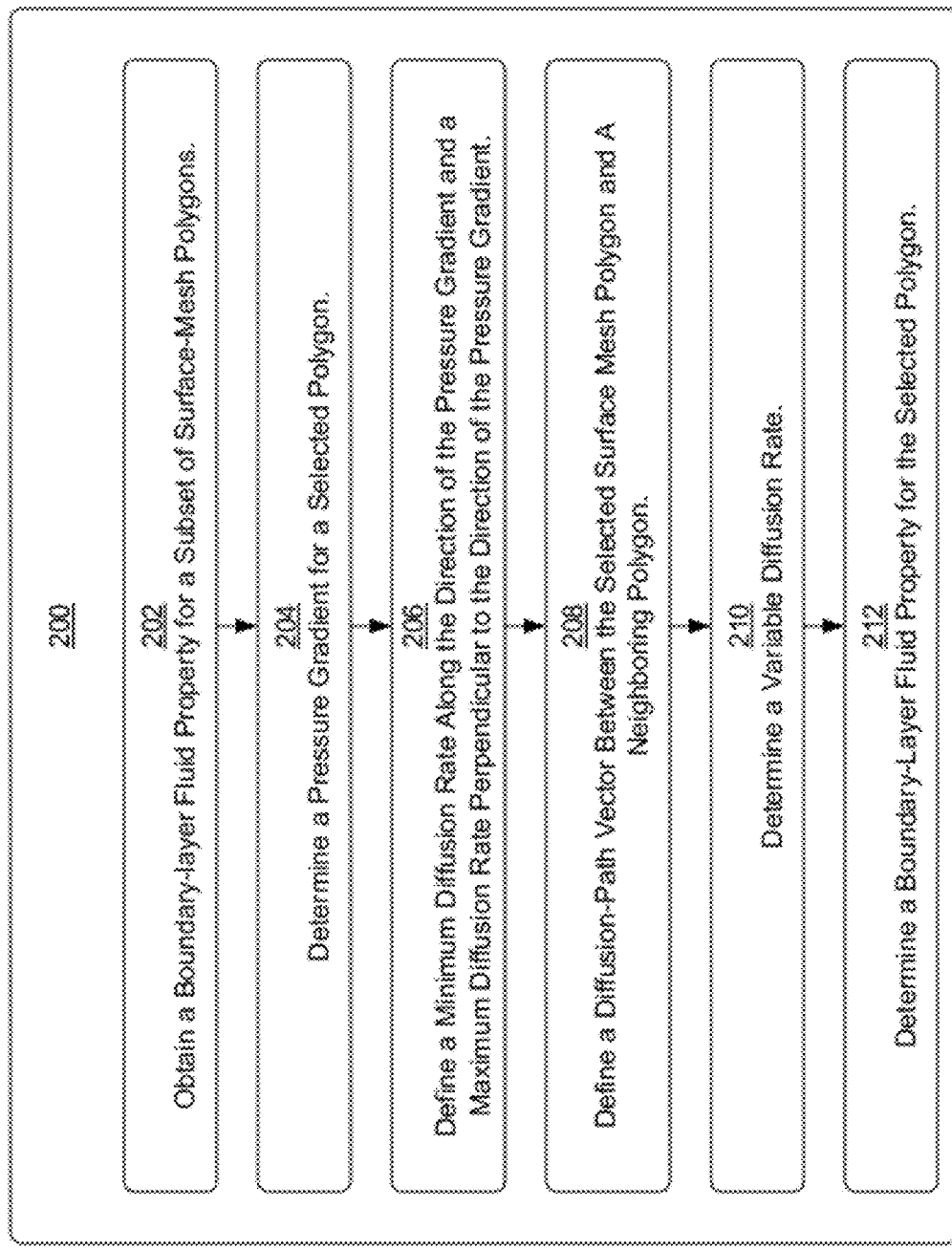
FIG. 2 depicts an exemplary process for propagating a boundary-layer fluid property over a computer-generated aircraft surface using anisotropic diffusion.

1. Exemplary Process for Propagating a Fluid Property Using Diffusion Techniques FIG. 2 depicts an exemplary process 200 for propagating the results of a boundary-layer CFD simulation module for a computer-generated aircraft surface. The results of the boundary-layer CFD simulation module include one or more boundary-layer fluid properties (e.g., pressure, temperature, surface velocity, boundary-layer thickness). For purposes of this discussion, a computer-generated wing surface is used. However, the technique can be applied to nearly any type of computer-generated aircraft surface, including a computer-generated surface for an aircraft fuselage, nacelle, shroud, or other structure.

The exemplary process 200 uses a diffusion technique to propagate a fluid property over the computer-generated aircraft surface. The term diffusion, as it is used below, relates to a technique for estimating fluid property values over a computer-generated surface using fluid property values that are (initially) known for only a portion of the computer-generated surface. The estimation is based, in part, on a modified version of the heat equation, which is also referred to herein as a diffusion equation. Traditionally, a diffusion equation can be used to predict heat diffusion or conduction through a mass or body of material. However, rather than predict the physical diffusion of heat energy, the exemplary process 200 uses a diffusion equation to propagate or distribute fluid property values from one portion of a computer-generated surface (where the fluid properties are known) to other portions of the computer-generated surface (where the fluid properties are not known).

An exemplary two-dimensional, isotropic diffusion equation that can be used to diffuse a fluid property u over a distance x and y can be expressed as:

$$\frac{\delta u}{\delta t} = \alpha \left( \frac{\delta^2 u}{\delta x^2} + \frac{\delta^2 u}{\delta y^2} \right).$$ Equation 1 where α is a positive constant representing the diffusion rate and t is time. The diffusion rate α (also called a conduction constant) determines the rate of diffusion over a given distance, also called a diffusion path. As applied in the exemplary process 200 below, a diffusion path is typically defined between two points on a computer-generated aircraft surface: a first point having an unknown fluid property value and a second point with a known fluid property value. In general, a large diffusion rate tends to produce a more uniform fluid-property distribution between the two points along a diffusion path. That is, the unknown fluid property value at the first point will be closer to the known fluid property value at the second point. Conversely, a small diffusion rate tends to produce a less uniform fluid-property distribution between two points along a diffusion path.

Typically, process 200 is performed as part of a computer-generated simulation for a computer-generated aircraft surface. As mentioned above and discussed in more detail below with respect to FIGS. 7a and 7b, a computer-generated simulation can be performed using two CFD simulation modules. In the exemplary process 200, an inviscid CFD simulation module is used to predict the fluid properties for an inviscid fluid-flow region and a viscous or boundary-layer CFD simulation module is used to predict the fluid properties of a viscous fluid-flow region.

Figure 3:
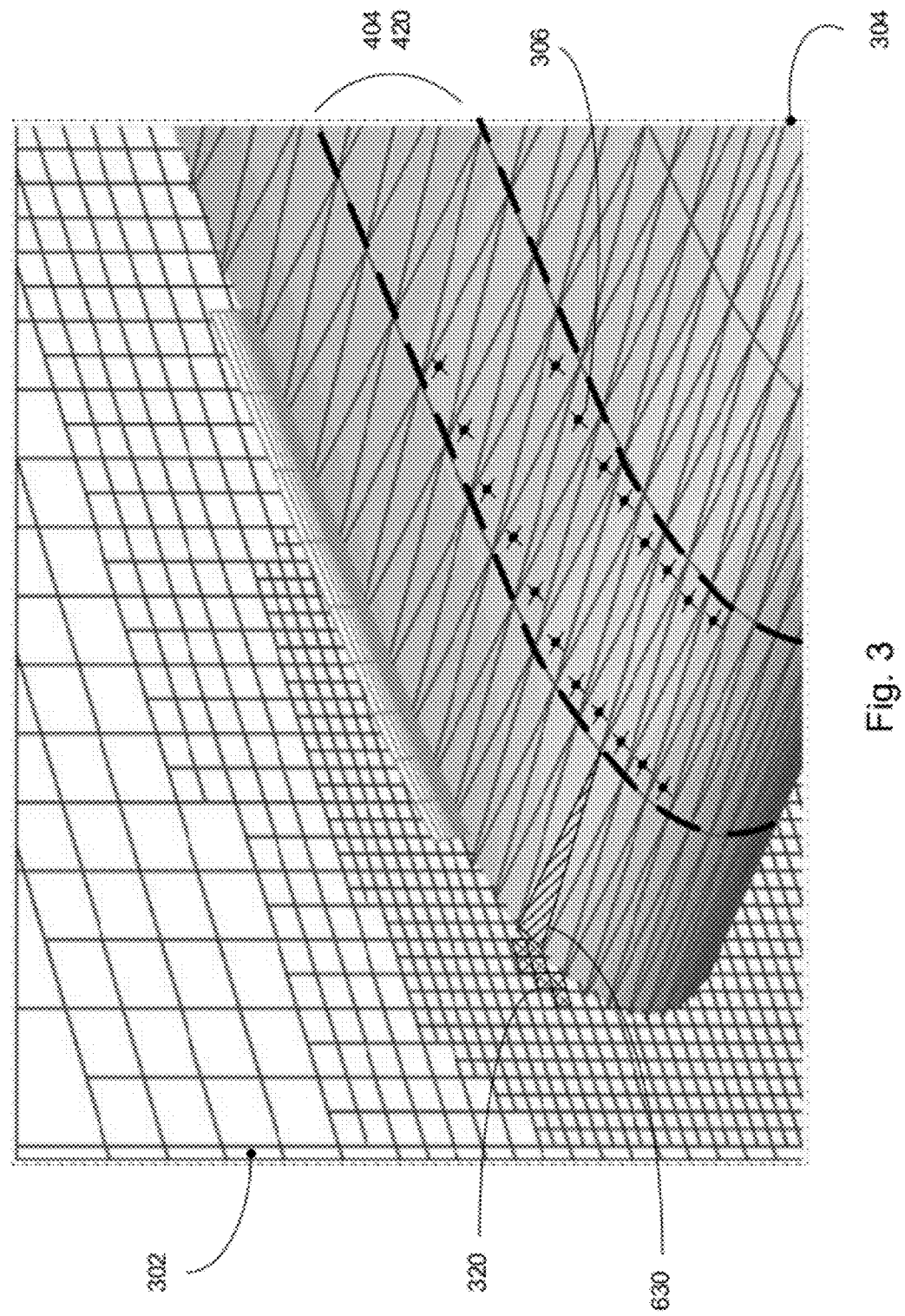
FIG. 3 depicts an exemplary surface mesh and fluid-flow mesh for simulating a fluid flow over a computer-generated wing surface.

As shown in FIG. 3, the inviscid fluid-flow region may be discretized using a fluid-flow mesh 302. In the following example, fluid-flow mesh 302 represents the inviscid fluid-flow region using a three-dimensional array of fluid cells, each fluid cell associated with one or more inviscid-fluid properties. As explained in more detail below, an inviscid CFD simulation module (using, for example, field equation 13, below) can be used to determine inviscid-fluid properties for each fluid cell of the fluid-flow mesh 302.

FIG. 3 also depicts a computer-generated aircraft surface, specifically a wing surface, discretized using a surface mesh of polygons 304. While FIG. 3 depicts a surface mesh of triangular polygons, other types of polygons can also be used. FIG. 3 also depicts an exemplary strip area 404 and subset of polygons 420, discussed in more detail below with respect to FIGS. 4, 5, and 6.

The boundary-layer fluid-flow region is discretized using a two-dimensional array of points within the surface mesh of polygons 304. As shown in FIG. 3, the boundary-layer region may be represented using boundary-layer prediction points 306 located on the computer-generated surface. In this example, each boundary-layer prediction point 306 corresponds to a polygon in the surface mesh of polygons 304. The boundary-layer prediction points 306 can be located virtually anywhere with respect to a corresponding polygon. However, for ease of explanation, the boundary-layer prediction points 306 are depicted as being located near the centroid of each corresponding polygon. While the computer-generated wing surface is a three-dimensional representation, the surface mesh of polygons 304 and corresponding boundary-layer prediction points 306 can be treated as a two-dimensional space projected onto the three-dimensional computer-generated wing surface. That is, each polygon or boundary-layer prediction point 306 can be identified and located with respect to the computer-generated wing surface using two coordinate values (x and y).

Discussed in more detail below with respect to equation 2, FIG. 3 also depicts exemplary selected polygon 630 and a set of fluid cells 320, close in proximity to selected polygon 630.

Figure 5:
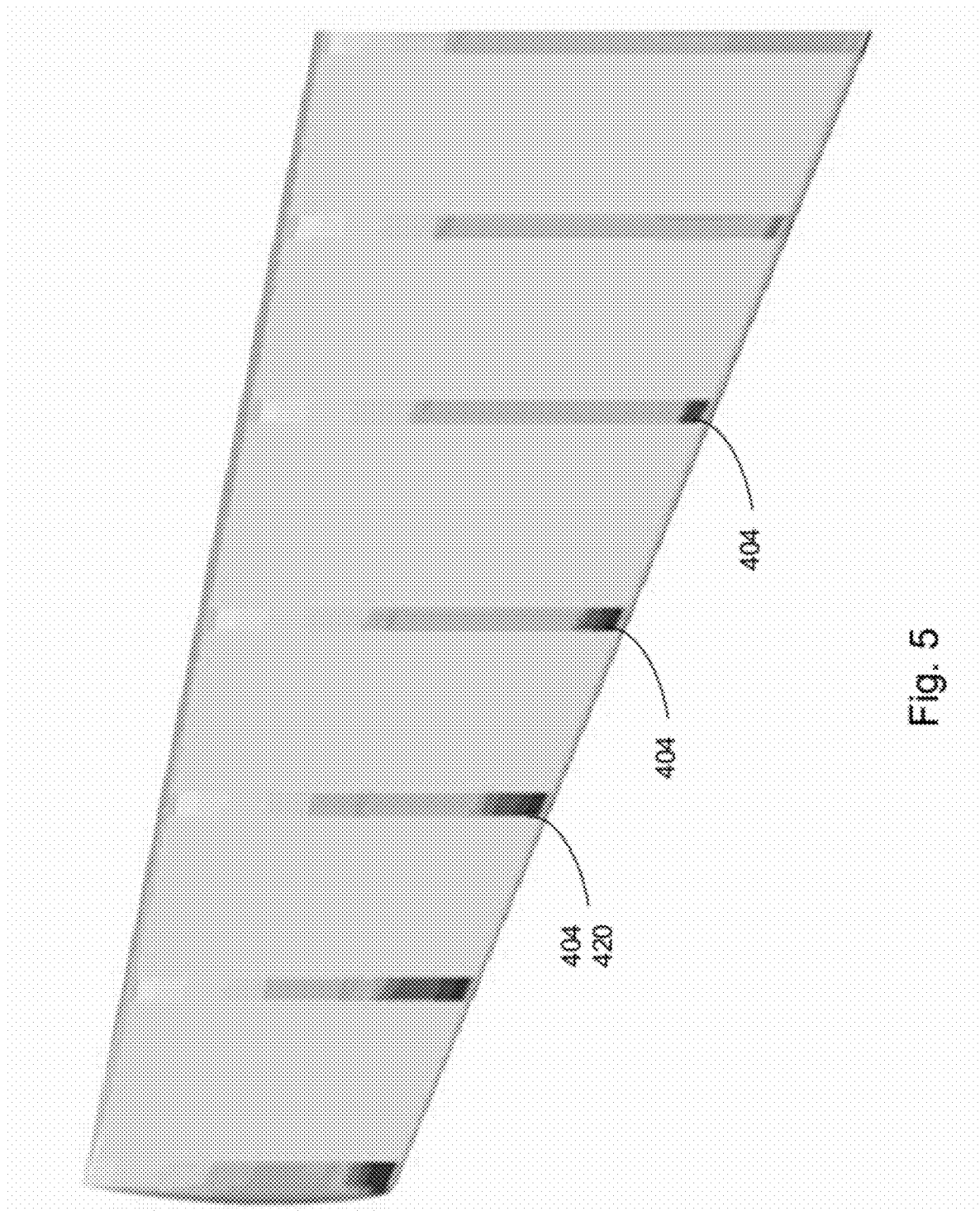
FIG. 5 depicts results of a boundary-layer CFD simulation performed only for strip areas of a wing surface.

The following operations can be performed as an exemplary process 200 for diffusing a boundary-layer property over a computer-generated surface. In operation 202, a boundary-layer fluid property for a subset of polygons is obtained. As shown in FIG. 4, the subset of polygons 420 may be defined as the surface-mesh polygons within a strip area 404. For simulations using a computer-generated wing surface, as shown in FIG. 5, the strip areas 404 may extend along the chord direction or stream-wise across the computer-generated wing surface. Also shown in FIG. 5, multiple strip areas 404 may be spaced at a regular distance along the span of the wing. In alternative arrangements, the strip areas 404 can be oriented along different directions and placed at various locations along the computer-generated wing surface.

In this example, a strip area 404 is used to define the subset of polygons 420. However, other shapes or techniques can be used to select the subset of polygons 420, as long as the number of polygons in the subset of polygons 420 is fewer than the number of polygons in the surface mesh of polygons 304. For example, the subset of polygons 420 may be defined as those polygons located within a radial distance of a point on the computer-generated aircraft surface. In another example, the subset of polygons 420 may be one polygon.

To reduce the number of simulation calculations, the boundary-layer simulation is only performed for boundary-layer prediction points 306 associated with the subset of polygons 420. Using the example shown in FIG. 4, the boundary-layer simulation is performed for each boundary-layer prediction point 306 associated with a polygon of the subset of polygons 420 (e.g., polygons within strip areas 404). Note, a boundary-layer simulation is not performed for boundary-layer prediction points 306 associated with polygons that are not part of the subset of polygons 420 (e.g., polygons between strip areas 404).

As explained in more detail below with respect to FIGS. 7a and 7b, a boundary-layer CFD simulation (using, for example, field equations 14 and 15, below) can be used to determine a boundary-layer fluid property for each boundary-layer prediction point 406 associated with a polygon of the subset of polygons.

FIG. 5 depicts exemplary results of operation 202. That is, FIG. 5 depicts the results of a boundary-layer CFD simulation performed only for a subset of polygons 420 (within strip areas 404). The shaded areas in FIG. 5 represent the portions of the boundary-layer fluid-flow region where the boundary-layer fluid properties are known. Changes in the degree of shading represent variations in the boundary-layer fluid property values. Note that the grey regions (between strip areas 404) represent portions of the boundary-layer fluid-flow region where the boundary-layer fluid properties are not known.

In operation 204, a pressure gradient vector $\vec{\nabla p}$ is determined for a selected polygon. In the examples shown in FIGS. 3 and 6, the selected polygon 630 is a polygon of the surface mesh of polygons 304 but is not one of the subset of polygons 420. The direction component of pressure gradient vector $\vec{\nabla p}$ indicates the direction of greatest pressure change with respect to the fluid flow near the selected polygon 630.

The pressure gradient $\vec{\nabla p}$ can be determined using the inviscid fluid-properties of the fluid-flow mesh 302. As explained above, an inviscid CFD simulation module can be used to predict the inviscid fluid properties of fluid cells in the fluid-flow mesh 302. Typically, the inviscid fluid properties are known for at least the fluid cells (of the fluid-flow mesh 302) that are close in proximity to the computer-generated aircraft surface used for the simulation (e.g., the computer-generated wing surface). In contrast, as mentioned above, the boundary-layer fluid properties are (initially) only known for the subset of polygons 420 within strip area 404.

Changes in the inviscid fluid pressure can be indicative of changes in the boundary-layer fluid properties. Therefore, an inviscid pressure gradient vector can be used as a suitable proxy for the gradient of the boundary-layer property being diffused.

In one example, the pressure gradient vector $\vec{\nabla p}$ is determined by identifying a set of fluid cells 320 of the fluid-flow mesh 302 that are close in proximity to the selected polygon 630. (See FIG. 3.) Generally, a two-dimensional pressure gradient vector in an x-y space can be defined as:

$$\vec{\nabla p} = \left(\frac{\delta p}{\delta x}, \frac{\delta p}{\delta y}\right),\qquad\text{Equation 2}$$

where p is the pressure of the inviscid fluid flow near the surface of the wing (represented by the identified set of fluid cells 320 close in proximity to the selected polygon 630). Because the wing is a three-dimensional shape, the proximate inviscid fluid flow represented by the identified set of fluid cells 320 will also be three-dimensional. However, for the sake of simplicity, an inviscid fluid pressure distribution corresponding to the identified set of fluid cells 320 can be treated as a two-dimensional distribution mapped to the computer-generated aircraft surface. Because, in many cases, the inviscid fluid pressure distribution is different for different areas of the computer-generated aircraft surface, a pressure gradient should be determined for each selected polygon within the surface mesh of polygons.

As explained in more detail below with respect to operations 206 and 212, the pressure gradient vector $\vec{\nabla p}$ is used to determine the primary and secondary diffusion directions.

For example, the direction of the pressure gradient vector $\vec{\nabla p}$ may be used as the first primary direction $d_1$. The direction perpendicular to the pressure gradient vector $\vec{\nabla p}$ may be used as the second primary direction $d_2$.

In operation 206, maximum and minimum diffusion rates are defined ($\alpha_{max}$, $\alpha_{min}$, respectively). As discussed above, the diffusion rate determines, in part, the amount of diffusion along a diffusion path. In this example, a minimum diffusion rate $\alpha_{min}$ is selected for diffusion paths along the first primary direction $d_1$ (the direction of the pressure gradient vector $\vec{\nabla p}$). A maximum diffusion rate $\alpha_{max}$ is selected for diffusion paths along the second primary direction $d_2$ (the direction perpendicular to the direction of the pressure gradient vector $\vec{\nabla p}$). In some cases, the maximum diffusion rate $\alpha_{max}$ is 1,000 to 1,000,000 times the minimum diffusion rate $\alpha_{min}$.

In some cases, when the pressure gradient vector $\vec{\nabla p}$ is small or nearly zero, a single diffusion rate can be used. If the diffusion rate is equal or nearly equal in all directions, the maximum and minimum diffusion rates ($\alpha_{max}$, $\alpha_{min}$) may be treated as equal, or one of the diffusion rates ($\alpha_{max}$) can be used as the sole diffusion rate. For example, as discussed in more detail below with respect to equation 9, when the pressure gradient vector $\vec{\nabla p}$ is small or nearly zero, the diffusion rate does not depend on direction, and isotropic diffusion can be applied using the maximum diffusion rate ($\alpha_{max}$).

Figure 6:
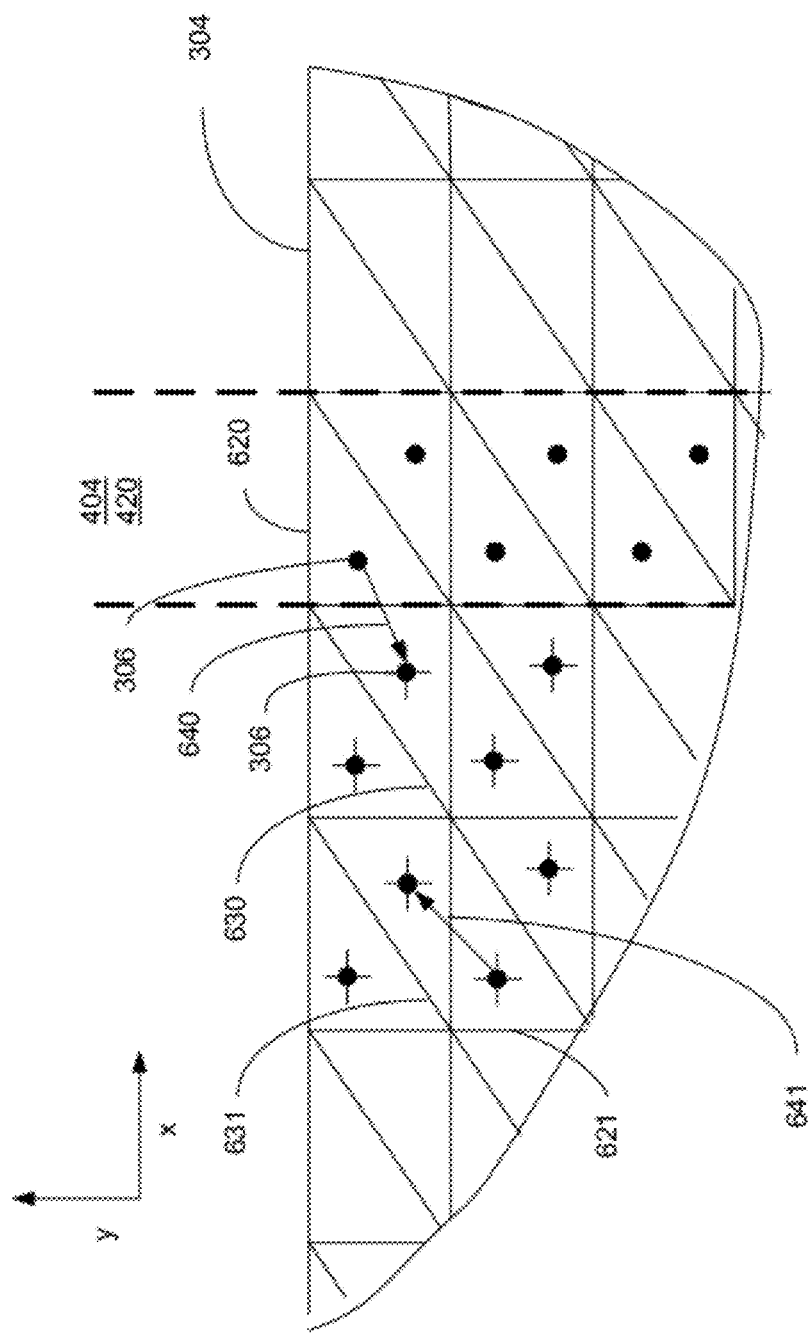
FIG. 6 depicts exemplary diffusion paths on a surface mesh of polygons representing a computer-generated wing surface.

In operation 208, a diffusion path vector $\vec{d}$ is defined between the selected polygon and a neighboring polygon. The neighboring polygon may or may not be immediately adjacent to the selected polygon. FIG. 6 depicts an exemplary selected polygon 630 and neighboring polygon 620. The diffusion path vector 640 $\vec{d}$ between the selected polygon 630 and neighboring polygon 620 can be defined as a vector between the respective boundary-layer prediction points 306 of the selected polygon 630 and neighboring polygon 620. The direction $d_{diffuse}$ of the diffusion path vector 640 $\vec{d}$ can be expressed as an angle from horizontal.

In FIG. 6, the selected polygon 630 is a polygon outside of the strip area 404. Therefore, selected polygon 630 is not one of the subset of polygons for which a boundary-layer fluid property is known. In this example, neighboring polygon 620 is inside of the strip area 404, and therefore is one of the subset of polygons 420 for which a boundary-layer fluid property is known. Thus, in this example, the diffusion path vector 640 $\vec{d}$ defines a path from a portion of the boundary-layer fluid-flow region where the fluid properties are known to a portion of the boundary layer fluid-flow region where the fluid properties are not known.

Other diffusion paths are also possible. For example, FIG. 6 depicts an alternative selected polygon 631 and alternative neighboring polygon 621. Here, both the selected polygon 631 and neighboring polygon 621 are outside of the strip area 404. The diffusion path vector 641 $\vec{d}$ defines a path between two portions of the boundary layer fluid-flow region where the fluid properties are unknown.

In operation 210, a variable diffusion rate $\alpha_v$ is determined. The variable diffusion rate $\alpha_v$ depends on the direction $d_{\textit{diffuse}}$ of the diffusion path vector $\vec{d}$, the maximum diffusion rate $\alpha_{max}$, minimum diffusion rate $\alpha_{min}$, and first primary direction $d_1$. As explained above, the minimum diffusion rate $\alpha_{min}$ applies to diffusion along the first primary direction $d_1$ (the direction of the pressure gradient vector $\vec{\nabla p}$). The maximum diffusion rate $\alpha_{max}$ applies to diffusion along a second primary direction $d_2$ (the direction perpendicular to the direction of the pressure gradient vector $\vec{\nabla p}$). For diffusion in directions other than the first or second primary directions ($d_1$, $d_2$), an elliptical relationship can be used to determine the diffusion rate associated with a specified diffusion direction $d_{\textit{diffuse}}$. An elliptical relationship for the variable diffusion rate $\alpha_v$ can be expressed as:

$$\alpha_v = \sqrt{\alpha_{min}^2 \cos^2(\theta) + \alpha_{max}^2 \sin^2(\theta)}. \quad \text{Equation 3}$$

Therefore, the diffusion rate $\alpha_v$ is equal to the square root of the sum of the square of the minimum diffusion rate $\alpha_{max}$ times cosine theta $\theta$ and the square of the maximum diffusion rate $\alpha_{min}$ times sine theta $\theta$ (where theta $\theta$ is the angle between the specified diffusion direction $d_{\textit{diffuse}}$ and the first primary direction $d_1$). While equation 3 depicts one exemplary technique for determining the variable diffusion rate $\alpha_v$, other techniques can be used to determine the variable diffusion rate a, using the diffusion path vector $d_{\textit{diffuse}}$, the maximum diffusion rate $\alpha_{max}$, minimum diffusion rate $\alpha_{min}$, and first primary direction $d_1$.

In operation 212, a boundary-layer fluid property is determined for the selected polygon. A diffusion equation can be used to determine the boundary-layer fluid property u for the selected polygon. An anisotropic diffusion equation can be used to account for the changes in diffusion rate due to changes in the diffusion direction. An anisotropic diffusion equation for fluid property u over a time increment t can be expressed as:

$$\frac{du}{dt} = \frac{\partial}{\partial d}\left(\alpha_v \frac{\partial u}{\partial d}\right). \quad \text{Equation 4}$$

where, as shown above in equation 3, $\alpha_v$ is a function of the maximum diffusion rate $\alpha_{max}$, the minimum diffusion rate $\alpha_{min}$, the first primary direction $d_1$, and the diffusion direction $d_{\textit{diffuse}}$. Because the first primary direction $d_1$ varies depending on the direction of the gradient vector $\vec{\nabla p}$, the value of $\alpha_v$ may also vary for different locations on the computer-generated wing surface. The diffusion angle $d_{\textit{diffuse}}$ and the diffusion distance d may be the direction and magnitude components, respectively, of a diffusion path vector $\vec{d}$.

As explained in more detail below with respect to discretized modeling techniques (Section 2, below), anisotropic diffusion may be implemented over a computer-generated aircraft surface using two-dimensional coordinates x and y. Anisotropic diffusion for a fluid property u over a time increment t can also be expressed in terms of two-dimensional coordinates x and y:

$$\frac{du}{dt} = \quad \text{Equation 5}$$
$$\frac{\partial}{\partial x}\left(\alpha_{xx}\frac{\partial u}{\partial x}\right) + \frac{\partial}{\partial x}\left(\alpha_{xy}\frac{\partial u}{\partial y}\right) + \frac{\partial}{\partial y}\left(\alpha_{yx}\frac{\partial u}{\partial x}\right) + \frac{\partial}{\partial y}\left(\alpha_{yy}\frac{\partial u}{\partial y}\right),$$

where $\alpha_{xx}$, $\alpha_{xy}$, $\alpha_{yx}$, and $\alpha_{yy}$ are components of a two-dimensional diffusion coefficient tensor. The values of $\alpha_{xx}$, $\alpha_{xy}$, $\alpha_{yx}$, and $\alpha_{yy}$ can be determined using the following exemplary relationships:

$$\alpha_{xx} = \alpha_{min} \sin^2(\phi) + \alpha_{max} \cos^2(\phi); \quad \text{Equation 6}$$

$$\alpha_{xy} = \alpha_{yx} = \alpha_{min} \cos(\phi)\sin(\phi) - \alpha_{max} \cos(\phi)\sin(\phi); \quad \text{Equation 7}$$

$$\alpha_{yy} = \alpha_{min} \cos^2(\phi) + \alpha_{max} \sin^2(\phi); \quad \text{Equation 8}$$

where phi $\phi$ is the angle between the second primary direction $d_2$ and the x-axis. Thus, similar to $\alpha_v$ as shown above in equation 3, $\alpha_{xx}$, $\alpha_{xy}$, $\alpha_{yx}$, and $\alpha_{yy}$ are also a function of maximum diffusion rate $\alpha_{max}$, the minimum diffusion rate $\alpha_{min}$, the first primary direction $d_1$, and the diffusion direction $d_{\textit{diffuse}}$.

In some cases, as mentioned above with respect to equation 2, a pressure gradient vector $\vec{\nabla p}$ that is small or near zero may indicate that the diffusion rate does not vary significantly with respect to diffusion direction. Thus, when the pressure gradient vector $\vec{\nabla p}$ is small or near zero, either the maximum or minimum diffusion rates ($\alpha_{max}$ or $\alpha_{min}$, respectively) may be used as the diffusion rate $\alpha_v$ to predict the fluid property using an isotropic diffusion equation. For example, below is an exemplary two-dimensional isotropic equation that can be used to diffuse a fluid property u over time t along directions x and y:

$$\frac{du}{dt} = \frac{\partial}{\partial x}\left(\alpha_v \frac{\partial u}{\partial x}\right) + \frac{\partial}{\partial y}\left(\alpha_v \frac{\partial u}{\partial y}\right). \quad \text{Equation 9}$$

In this special case, the variable diffusion rate $\alpha_v$ can be set to either the maximum diffusion rate $\alpha_{max}$, the minimum diffusion rate $\alpha_{min}$, or an average of the maximum and minimum diffusion rates.

Using either equations 4, 5, or 9, a boundary-layer fluid property u for the selected polygon can be determined. The operations of process 200 can be repeated for multiple selected polygons of the surface mesh of polygons. In some cases, the operations of process 200 are repeated for each polygon (of the surface mesh of polygons 304) that is not one of the subset of polygons 420 for which a boundary-layer property was obtained using the boundary-layer CFD module. For example, with regard to the examples depicted in FIGS. 3, 4, 5, and 6, the process 200 can be repeated for every polygon in the surface mesh of polygons 304 between strip areas 404.

Equations 4, 5, and 9 are each expressed with respect to a small time step dt and are capable of determining a transient or time-dependent fluid property value. However, the transient or time-dependent results are not necessary to estimate the fluid property distribution over the computer-generated aircraft surface. In most cases, the steady-state solution is used as the estimation of the boundary-layer fluid property u. For example, if the differential equations 4, 5, or 9 are solved using an explicit method, the explicit method is iterated over multiple time steps until a steady-state solution is determined. If, instead, the differential equations 4, 5, or 9 are solved using an implicit method, a steady-state condition is assumed and the boundary-layer fluid property u is solved simultaneously for multiple polygons in the surface mesh of polygons. An example of explicit and implicit solution techniques is described in more detail below in Section 2.

2. Discretized Modeling Techniques

The diffusion differential equations 4, 5, and 9 may be implemented over a surface mesh of polygons 304 by using a numerical approximation technique. As shown in FIGS. 3, 4, and 6, each polygon of the surface mesh of polygons 304 may have an associated boundary-layer prediction point 306. The diffusion equations 4, 5, and 9 can be approximated using an explicit finite difference solver that references values of the fluid property u at each boundary-layer prediction point 306 designated by coordinate location i, j. A simplified two-dimensional finite difference solver using central differencing for the spatial derivatives can be expressed as:

$$u^n = -u^{n-1} + \alpha \left( \frac{u_{i+1,j} - 2u_{i,j} + u_{i-1,j}}{\Delta x^2} + \frac{u_{i,j+1} - 2u_{i,j} + u_{i,j-1}}{\Delta y^2} \right)^{n-1} \Delta t + E, \quad \text{Equation 10}$$

where n is the current time step and n−1 is the previous time step, i is the index along the x-direction, j is the index along the y-direction, and E is the error. Equation 10 can be used for a surface mesh of rectangular polygons. A variant of equation 10 may be used for surface meshes having polygons that are not rectangular (e.g., triangular).

Equation 10 describes an explicit solving method that can be used to diffuse a fluid property u among surface-mesh points associated with polygons not belonging to the subset of polygons 420 (e.g., outside of the strip areas 404). The explicit method of equation 10 is typically iterated over multiple increments of time t until the results converge to a steady-state solution. The error term E is included in equation 10 to account for error due to the discretization of the diffusion equation. To minimize the error E, the time step increment should be sufficiently small. Too large of a time step increment will produce inaccurate results and the explicit method may become unstable. To maintain stability, the time-step increment may be directly proportional to the square of the longest dimension of the surface-mesh polygon.

Because smaller time-step increments require more iterations before reaching a steady state, the explicit solving method using equation 10 may require significant computing resources. Although the solution at each time step may be relatively easy to calculate, it may take tens of thousands of iterations to produce reliable results.

Alternatively, an implicit method can be used by assuming a steady-state condition. For example, at steady-state, the sum of the spatial derivatives and the error are zero, allowing:

$$\frac{u^{i+1,j} - 2u^{i,j} + u^{i-1,j}}{\Delta x^2} + \frac{u^{i,j+1} - 2u^{i,j} + u^{i,j-1}}{\Delta y^2} = 0. \quad \text{Equation 11}$$

Equation 11 can be used for a surface mesh of rectangular polygons. A variant of equation 11 may be used for surface meshes having polygons that are not rectangular (e.g., triangular). Instead of stepping through time, as with the explicit method shown in equation 10, a set of linear equations can be constructed. Each linear equation of the set corresponds to a boundary-layer prediction point for a polygon of the surface mesh of polygons. Mathematically, this can be represented as:

$$[A][u] = 0, \quad \text{Equation 12}$$

where [A] is the matrix of coefficients computed using equation 11 and [u] is the solution vector that represents the value of the diffused fluid property at each boundary-layer prediction point. For large surface meshes having a large number of boundary-layer prediction points, the matrix [A] can become very large. However, matrix [A] is typically sparse (i.e., populated mostly with zeros), and therefore even a large matrix [A] may be relatively easy to solve. Using an efficient sparse-matrix solver, the implicit method of equation 12 may be solved orders of magnitude faster than iterating through the explicit method shown in equation 10, above.

While the finite difference techniques exemplified in equations 10 and 12 are relatively straightforward to calculate, the results may vary depending on the geometry of the surface-mesh polygons. In particular, a surface mesh of polygons that is less orthogonal than others may not diffuse a fluid property equally in all directions. A mesh is said to be more orthogonal when there are more lines that can be drawn between the centroids of adjoining polygons that intersect the common edge between the polygons perpendicularly.

As an alternative, a finite-volume method can be used to discretize the diffusion differential equations 4, 5, and 9. In one example, a volume cell is defined for polygon of the surface mesh. The volume cell may be defined, for example, as the geometry of the polygon extruded a nominal thickness. Finite-volume methods typically provide a more uniform diffusion because a finite-volume method requires that the energy related to the fluid property u be conserved between volumes associated with polygons of the surface mesh. Therefore, it may be advantageous to use a finite-volume method instead of finite-difference when discretizing either of the diffusion differential equations 4, 5, or 9.

3. Field Equations for Simulating Fluid Flow Over a Computer-Generated Wing Surface As discussed above, a fluid flow can be simulated using both inviscid and viscous CFD simulation modules to improve computing efficiency. The explanation below describes how the CFD simulation modules can be applied to different regions of fluid flow and provides exemplary field equations for simulating the dynamics of the fluid flow.

Figure 7A:
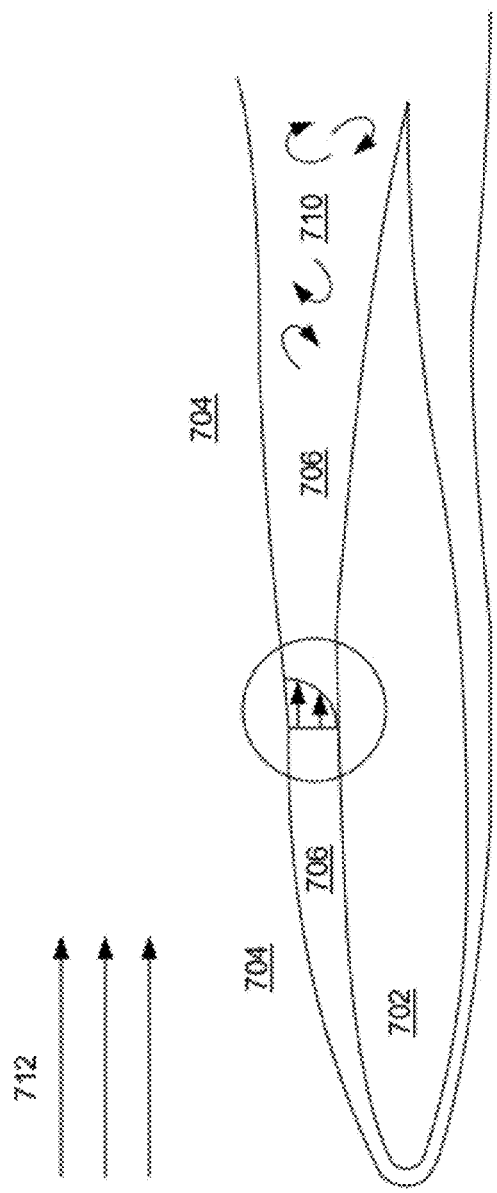
FIGS. 7a and 7b depict an exemplary fluid flow around a wing surface.
Figure 7B:
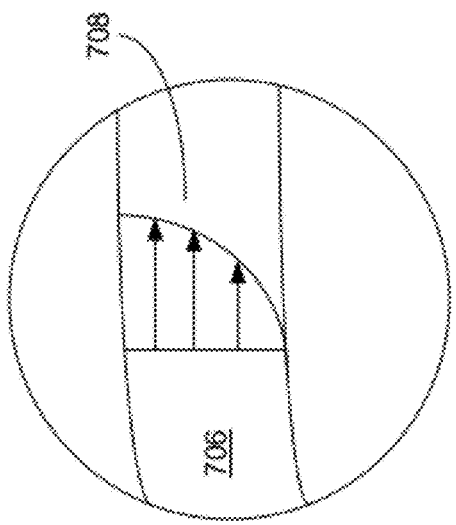

FIGS. 7a and 7b depict a cross-sectional representation of a fluid flow over a wing surface 702 classified by two regions: a free stream region 704 and a boundary-layer region 706.

As shown in FIG. 7a, the free-stream region 704 may be located away from the wing surface 702. However, the free stream region 704 may be close to the wing surface 702 in areas where the boundary layer region 706 is thin or has yet to develop. See, for example, the portion of the fluid flow in FIG.

7a near the leading edge of the wing surface 702. The free stream region 704 is usually characterized as having a relatively uniform velocity profile 712. When there is a uniform velocity profile 712, internal shear forces acting on a fluid may be relatively small, and therefore viscous contributions to the fluid dynamics can be minimized or ignored.

As mentioned previously, a CFD simulation module that ignores viscous effects may also be called an inviscid CFD simulation module. Equation 13, below, provides an exemplary field equation for an inviscid CFD simulation module. Equation 13, also called the Euler method, represents the conservation of mass, conservation of three components of momentum, and conservation of energy:

$$\frac{\delta m}{\delta t} + \frac{\delta f_x}{\delta x} + \frac{\delta f_y}{\delta y} + \frac{\delta f_z}{\delta z} = 0; \qquad \text{Equation 13}$$

where $$m = \begin{pmatrix} \rho \\ \rho u \\ \rho v \\ \rho w \\ E \end{pmatrix}; f_x = \begin{pmatrix} \rho u \\ p + \rho u^2 \\ \rho uv \\ \rho uw \\ u(E+p) \end{pmatrix}; f_y = \begin{pmatrix} \rho v \\ \rho uv \\ p + \rho v^2 \\ \rho vw \\ v(E+p) \end{pmatrix};$$

$$f_z = \begin{pmatrix} \rho w \\ \rho uw \\ \rho vw \\ p + \rho w^2 \\ w(E+p) \end{pmatrix};$$

where u, v, and w are components of the velocity vector, p is the pressure, $\rho$ is the density, and E is the total energy per unit volume. Combining equation 13 with an equation of state (e.g., the ideal gas law), an inviscid CFD simulation module can predict the fluid properties for the free stream fluid region 704.

FIGS. 7a and 7b also depict a boundary-layer region 706, located near a wing surface 702. The boundary layer region 706 is typically characterized by a sharply increasing velocity profile 708. Skin friction causes the velocity of the fluid flow very close to the wing surface to be essentially zero, with respect to the surface. A sharply increasing velocity profile 708 develops as the velocity increases from a near-zero velocity to the free stream velocity. The sharply increasing velocity profile 708 in the boundary-layer region 706 creates shear forces within the boundary-layer region 706. Due to the internal shear forces, viscous properties of the fluid influence fluid flow in the boundary-layer region 706. Therefore, a simulation of the fluid flow in the boundary-layer region 706 should account for viscous contributions to the flow dynamics. In some cases, the fluid flow in boundary-layer region 706 may be characterized as turbulent flow (region 710). Due to fluid vorticity, viscous properties of the fluid influence the fluid flow. Thus, a simulation of the turbulent flow should also account for viscous contributions to the flow dynamics. For purposes of this discussion, laminar and turbulent regions are treated as one boundary-layer region and simulated using a single CFD simulation module.

As mentioned previously, a CFD simulation module that accounts for viscosity may also be called a viscous CFD simulation module or a boundary-layer CFD simulation module. Below, exemplary field equations for a boundary-layer CFD simulation module are provided according to a Drela boundary-layer technique. Drela, M. "XFOIL: An Analysis and Design System for Low Reynolds Number Airfoils," pp. 1-12, *Proceedings of the Conference on Low Reynolds Number Aerodynamics* (T. J. Mueller ed., Univ. of Notre Dame, Notre Dame, Ind., 1989).

Equation 14, below, represents a boundary-layer integral momentum equation for compressible flow:

$$\frac{d\theta}{dx} + (2 + H - M_e^2)\frac{\theta}{u_e}\frac{du_e}{dx} = \frac{C_f}{2}, \qquad \text{Equation 14}$$

where $\theta$ is the momentum thickness, H is the shape factor, $M_e$ is the boundary-layer edge Mach number, $u_e$ is the boundary-layer edge velocity, and $C_f$ is the skin friction coefficient.

Equation 15, below, represents a boundary-layer kinetic energy integral equation:

$$\theta\frac{dH^*}{dx} + (2H^{**} + H^*(1-H))\frac{\theta}{u_e}\frac{du_e}{dx} = 2C_D - H^*\frac{C_f}{2}. \qquad \text{Equation 15}$$

As used in equations 14 and 15, above, shape factors H, H*, and H** are defined as:

$$H = \frac{\delta^*}{\theta} H^* = \frac{\theta^*}{\theta} H^{} = \frac{\delta^{}}{\theta};$$

displacement thickness $\delta^*$ is defined as:

$$\delta^* = \int_0^\infty \left(1 - \frac{\rho u}{\rho_e u_e}\right) dy;$$

momentum thickness $\theta$ is defined as:

$$\theta = \int_o^\infty \left(1 - \frac{u}{u_e}\right)\frac{\rho u}{\rho_e u_e} dy;$$

kinetic energy thickness $\theta^*$ is defined as:

$$\theta^* = \int_o^\infty \left(1 - \left(\frac{u}{u_e}\right)^2\right)\frac{\rho u}{\rho_e u_e} dy;$$

density thickness $\delta^{**}$ is defined as:

$$\delta^{**} = \int_o^\infty \left(1 - \frac{\rho}{\rho_e}\right)\frac{u}{u_e} dy;$$

skin friction coefficient $C_f$ is defined as:

$$C_f = \frac{\tau}{\frac{1}{2}\rho_e u_e^2};$$

and dissipation coefficient $C_D$ is defined as:

$$C_D = \frac{1}{\rho_e u_e^3} \int_o^\infty \tau \frac{\partial u}{\partial y} dy.$$

Solving equations 14 and 15 for local velocity u and density p, the boundary-layer CFD simulation module can predict the fluid properties for portions of the fluid flow within the boundary-layer region 706. Additionally, characteristics of the boundary layer, including boundary-layer thickness, can also be determined once the fluid properties are known.

In some cases, the boundary-layer CFD simulation module returns a transpiration flux value representative of a boundary-layer region having a predicted thickness $\delta^*$. A transpiration flux is a fictitious fluid flow into or out of the computer-generated aircraft surface. The transpiration flux displaces a portion of the free-flow region 704 in the same way as would the presence of a boundary layer having a predicted thickness $\delta^*$. This allows the boundary-layer region to be discretized using a set of boundary-layer prediction points instead of using small volumes or fluid cells. In general, as the magnitude of the transpiration flux increases, the fictitious fluid flow increases, simulating a thicker boundary layer. In some cases, the transpiration flux can be used to create a fictitious flow of air into the aircraft surface (negative flux), thereby simulating a boundary layer having a reduced thickness.

The transpiration flux can be determined using the output of the Drela boundary-layer technique described in equations 14 and 15, above. For example, the transpiration flow velocity $W_{iw}$ of the transpiration flux can be determined using:

$$W_{iw} = \frac{1}{\rho_{iw}} \frac{d}{ds}(\rho_{iw} U_{iw} \delta^*),\qquad \text{Equation 16}$$

where $\rho_{iw}$ is the density of the fluid flow at the aircraft surface, $U_{iw}$ is the velocity of the fluid flow at the aircraft surface, $\delta^*$ is the computed boundary-layer displacement thickness, and s is an arc length along the computer-generated aircraft surface. In some cases, the arc length s is the average distance between boundary-layer prediction points on the computer-generated aircraft surface. Equation 16 is taken from Lock, R. C., and Williams, B. R., "Viscous-Inviscid Interactions in External Aerodynamics," *Prog. Aerospace Sci.*, Vol. 24, 1987, pp. 51-171. Thus, the transpiration mass flux (density $\rho_{iw}$ times the transpiration flow velocity $W_{iw}$) is equal to the rate of change of the product of the local density $\rho_{iw}$, local velocity $U_{iw}$, and boundary-layer displacement thickness $\delta^*$ along the solution strip. A finite difference method can be used to compute the derivative in equation 16. For example, neighboring boundary-layer prediction points along the surface of the computer-generated aircraft surface can be used with a second order, backward Lagrange polynomial formulation to compute the derivative values.

The results of the inviscid CFD simulation module (using, for example, equation 13) are used by a viscous or boundary layer CFD module (using, for example, equations 14, 15, and 16) to predict the boundary-layer fluid properties for each boundary-layer prediction point. The boundary-layer fluid properties (e.g., boundary-layer thickness or transpiration flux) can then be used by the inviscid CFD simulation module to predict an updated or refined set of inviscid fluid property values. In this way, the inviscid and viscous CFD simulation modules can be used to iterate or refine the results of the computer-generated simulation.

4. Exemplary Results

Figure 8:
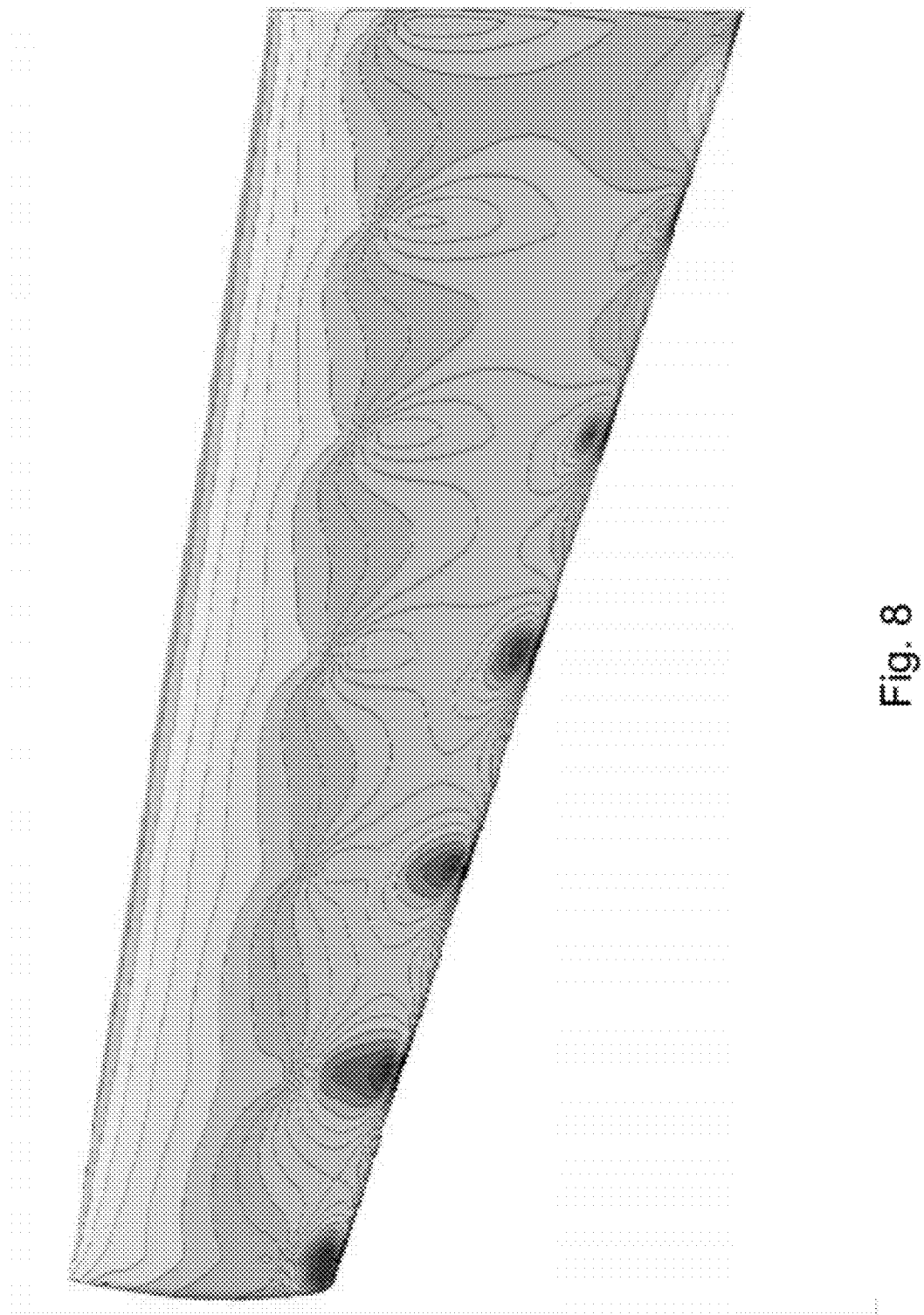
FIG. 8 depicts an exemplary pressure distribution over a computer-generated wing surface using isotropic diffusion and a finite-volume solver.
Figure 9:
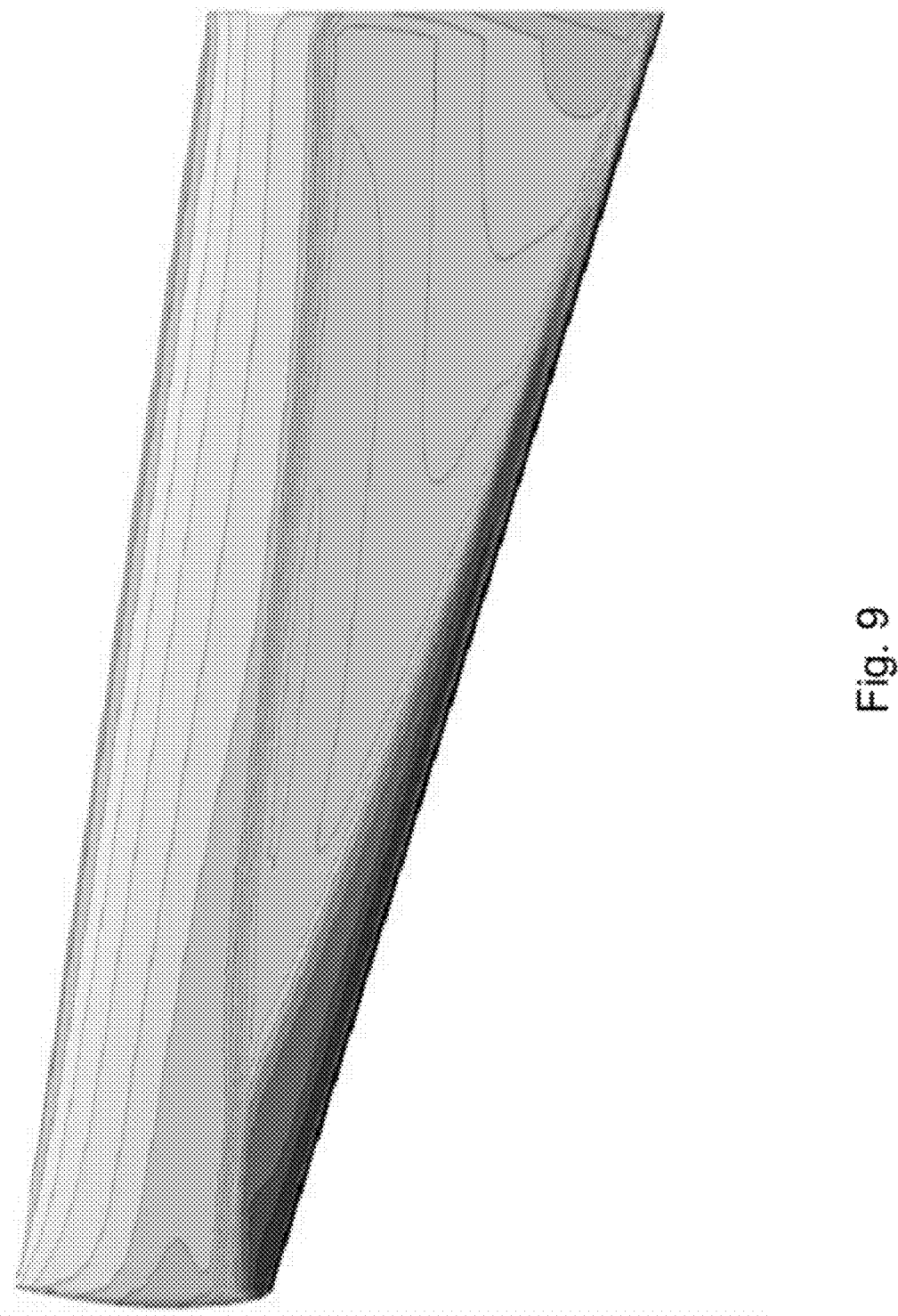
FIG. 9 depicts an exemplary pressure distribution over a computer-generated wing surface using an inviscid CFD simulation module.
Figure 10:
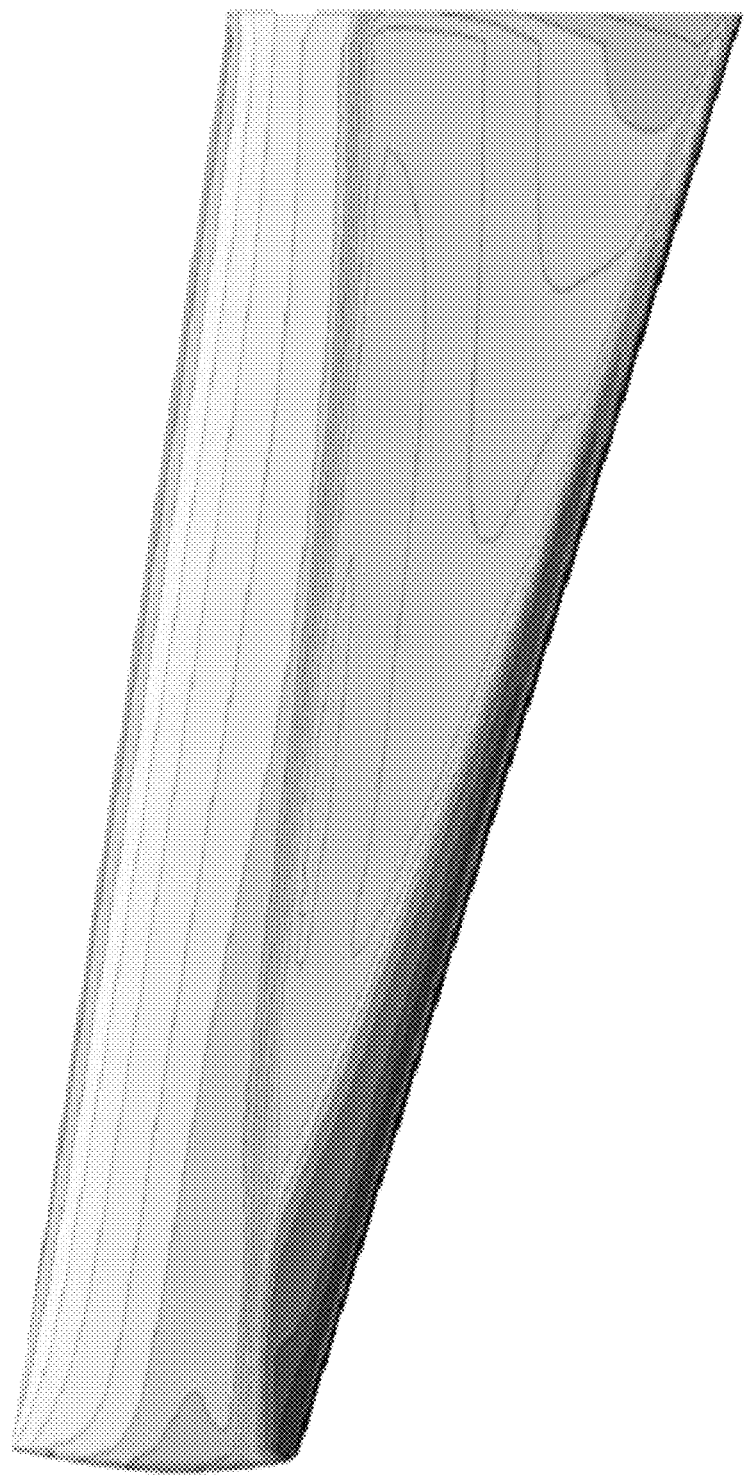
FIG. 10 depicts exemplary pressure distribution over a computer-generated wing surface using anisotropic diffusion and a finite-volume solver.

FIGS. 8 through 10 depict exemplary pressure distributions over a computer-generated wing surface. The following discussion compares results obtained using isotropic diffusion to results obtained using anisotropic diffusion.

In general, isotropic diffusion may be adequate for an aircraft surface in flow conditions producing relatively homogeneous boundary-layer fluid properties. As discussed above, this condition may be indicated by regions where the pressure gradient vector $\vec{\nabla}p$ is small or nearly zero.

However, in situations where the fluid properties change rapidly over an aircraft surface (e.g., the surface of a wing), isotropic diffusion may blend or distort regions of the surface having different fluid properties. For example, a wing surface having a rapidly changing pressure distribution due to the formation of a shock wave, the shape of the pressure distribution may become distorted or blurred when using an isotropic diffusion technique.

FIG. 8 depicts an exemplary pressure distribution produced by diffusing a fluid pressure over a computer-generated wing surface using: an initial condition shown in FIG. 5; fixed boundary conditions for strip areas 404; and isotropic diffusion discretized with a finite-volume solver. The pressure distribution of FIG. 8 can be compared to an exemplary pressure distribution depicted in FIG. 9 representing the pressure distribution predicted using an inviscid or Euler-based CFD simulation module.

As shown in FIG. 8, the pressure is lowest (designated by darker regions) in locations close to the strip areas where the fluid pressure was initially known. As explained above, a boundary-layer CFD simulation module can be used to determine the boundary-layer fluid properties associated with the surface-mesh polygons in the strip areas. The uneven distribution along the length of the wing indicates that diffusion perpendicular to the strip areas 404 is not sufficient to accurately propagate the pressure fluid property. Increasing the relative diffusion rate along this direction would reduce this effect. Also, comparing FIG. 8 and FIG. 9, the pressure distribution appears to be elongated along the chord of the wing in locations close to the strip areas 404. This indicates that there may be too much diffusion between different regions of pressure, resulting in distortion of the pressure regions. Decreasing the relative diffusion rate along this direction may reduce this effect. However, using the isotropic diffusion described in equation 9, above, the diffusion rate must be equal in all directions.

Anisotropic diffusion provides a variable diffusion rate (or conduction coefficient) that depends on the direction of diffusion (see, for example, equations 4 and 5, above). Using an anisotropic diffusion technique, the diffusion rate can be tailored to allow more diffusion in directions where propagation is desired and less diffusion in other directions to minimize distortion of the fluid property distribution. In particular, it is desirable to limit diffusion in directions where the fluid properties are changing most rapidly. In directions where the fluid properties are more homogenous, diffusion can be accelerated, allowing a more evenly-distributed propagation of the fluid property.

FIG. 10 depicts an exemplary pressure distribution over a wing surface produced by propagating or interpolating the fluid pressure over the wing surface using: an initial condition shown in FIG. 5; fixed boundary conditions on strip areas 404; and pressure-gradient-driven anisotropic diffusion discretized using a finite-volume solver. Note that the property distribution is similar to the inviscid flow pressure distribution shown in FIG. 9. In contrast to the property distribution shown in FIG. 8, the anisotropic diffusion does not distort the property distribution and produces a result that is more like the actual distribution over the exemplary aircraft surface.

5. Computer and Computer Network System

Figure 11:
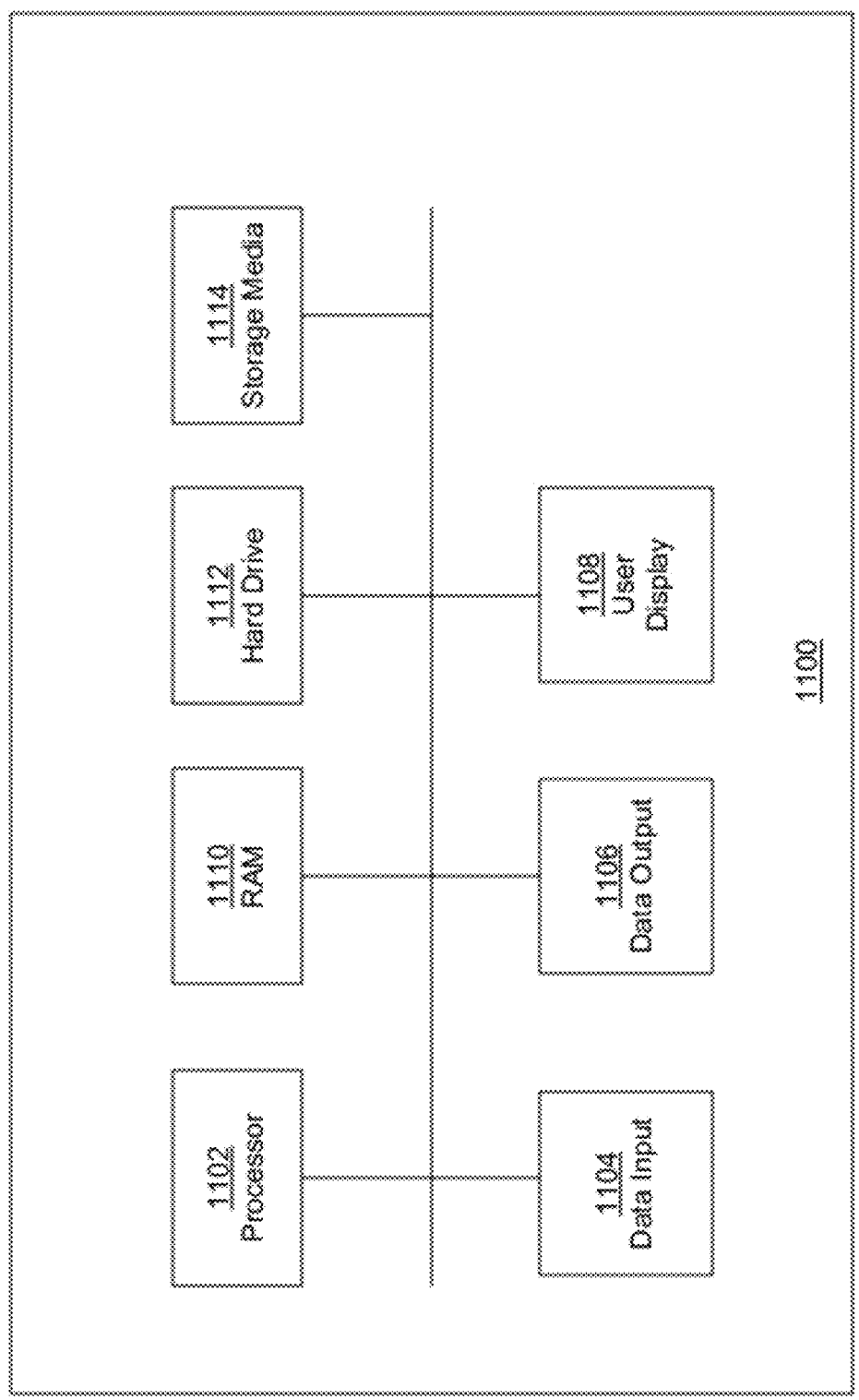
FIG. 11 depicts an exemplary computer system for simulating a fluid flow over a computer-generated aircraft surface.

The embodiments described herein are typically implemented as computer software (computer-executable instructions) executed on a processor of a computer system. FIG. 11 depicts an exemplary computer system 1100 configured to perform any one of the above-described processes. Computer system 1100 may include the following hardware components: processor 1102, data input devices (e.g., keyboard, mouse, keypad) 1104, data output devices (e.g., network connection, data cable) 1106, and user display (e.g., display monitor) 1108. The computer system also includes non-transitory memory components including random access memory (RAM) 1110, hard drive storage 1112, and other computer-readable storage media 1114.

Processor 1102 is a computer processor capable of receiving and executing computer-executable instructions for performing any of the processes described above. Computer system 1100 may include more than one processor for performing the processes. The computer-executable instructions may be stored on one or more types of non-transitory storage media including RAM 1110, hard drive storage 1112, or other computer-readable storage media 1114. Other computer-readable storage media 1114 include, for example, CD-ROM, DVD, magnetic tape storage, magnetic disk storage, solid-state storage, and the like.

Figure 12:
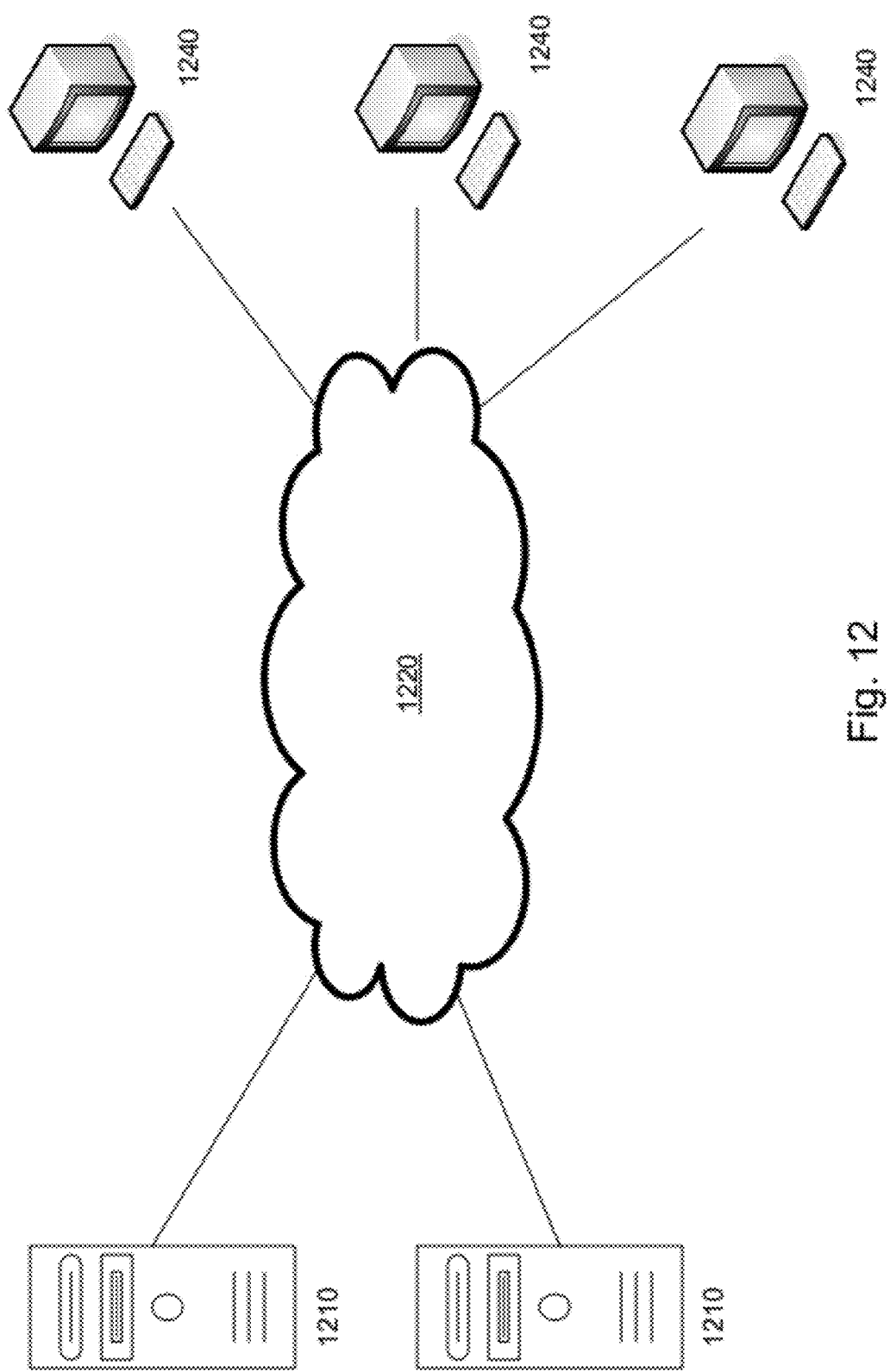
FIG. 12 depicts an exemplary computer network.

FIG. 12 depicts an exemplary computer network for distributing the processes described above to multiple computers at remote locations. One or more servers 1210 may be used to perform portions of the process described above. For example, one or more servers 1210 may store and execute computer-executable instructions for receiving information for generating a computer-generated simulation. The one or more servers 1210 are specially adapted computer systems that are able to receive input from multiple users in accordance with a web-based interface. The one or more servers 1210 are able to communicate directly with one another using a computer network 1220 including a local area network (LAN) or a wide area network (WAN), such as the Internet.

One or more client computer systems 1240 provide an interface to one or more system users. The client computer systems 1240 are capable of communicating with the one or more servers 1210 over the computer network 1220. In some embodiments, the client computer systems 1240 are capable of running a web browser that interfaces with a Web-enabled system running on one or more server machines 1210. The Web browser is used for accepting input data from the user and presenting a display to the user in accordance with the exemplary diffusion techniques described above. The client computer 1240 includes a computer monitor or other display device for presenting information to the user. Typically, the client computer 1240 is a computer system in accordance with the computer system 1100 depicted in FIG. 11.

Although the invention has been described in considerable detail with reference to certain embodiments thereof, other embodiments are possible, as will be understood by those skilled in the art.

We claim:

1. A computer-implemented method of generating a fluid-flow simulation over a computer-generated aircraft surface, the surface comprised of a surface mesh of polygons, the method comprising:

obtaining a boundary-layer fluid property for a subset of the polygons of the surface mesh of polygons, the subset of polygons representing a portion of the computer-generated aircraft surface;

determining, using a computer, a pressure-gradient vector for a selected polygon, the selected polygon belonging to the surface mesh of polygons but not one of the subset of polygons for which a boundary-layer fluid property has been obtained;

defining a minimum diffusion rate along the direction of the pressure-gradient vecto of the selected polygon;

defining a maximum diffusion rate in a direction perpendicular to the direction of the pressure-gradient vector of the selected polygon;

defining a diffusion-path vector from a point in the selected polygon to a neighboring point in a neighboring polygon, the neighboring polygon belonging to the subset of polygons for which a boundary-layer fluid property has been obtained; and determining, using the computer, an updated fluid property for the selected polygon using a variable diffusion rate, the variable diffusion rate based on the minimum diffusion rate, maximum diffusion rate, and angular difference between the diffusion-path vector and the pressure-gradient vector.

2. The computer-implemented method of claim 1, wherein the variable diffusion rate is equal to the square root of the sum of the square of the minimum diffusion rate times cosine theta and the square of the maximum diffusion rate times sine theta, wherein theta is the angle between the direction of the diffusion-path vector and the direction of the pressure-gradient vector.

3. The computer-implemented method of claim 1, wherein determining the updated fluid property for the selected polygon is performed using an explicit discretization comprising:

determining a distance between the point in the selected polygon and the neighboring point in the neighboring polygon;

determining a property difference between an initial fluid property of the selected polygon and a boundary-layer fluid property of the neighboring polygon; and determining an updated fluid property by adding the initial fluid property value to the variable diffusion rate multiplied by the property difference divided by the distance.

4. The computer-implemented method of claim 1, wherein determining the updated fluid property for the selected polygon is performed using an implicit discretization comprising:

obtaining coefficient values for a coefficient matrix, the coefficient values based on discretized spatial derivatives associated with the surface mesh of polygons;

determining a set of linear equations using the coefficient matrix, wherein each linear equation of the set of linear equations corresponds to a surface-mesh polygon of the surface mesh of polygons;

determining an updated property value associated with the selected polygon by simultaneously solving the set of linear equations, the updated property value representing the boundary-layer fluid property of the selected polygon.

5. The computer-implemented method of claim 1, wherein the point in the selected polygon is a centroid of the selected polygon and the neighboring point in the neighboring polygon is a centroid of the neighboring polygon.

6. The computer-implemented method of claim 1, wherein the boundary-layer fluid property is a boundary-layer displacement thickness.

7. The computer-implemented method of claim 1, wherein the boundary-layer fluid property is a transpiration flow vector, the transpiration flow vector having a direction and a rate of fluid flow originating from the aircraft surface so as to represent the presence of a boundary-layer fluid flow.

8. The computer-implemented method of claim 1, wherein obtaining the boundary-layer fluid property comprises:
   determining an inviscid fluid property for a set of fluid cells corresponding to the subset of the polygons using an inviscid fluid simulation that does not simulate fluid viscous effects; determining a boundary-layer prediction point for each polygon of the subset of the polygons; and
   determining a boundary-layer fluid property for each boundary-layer prediction point using inviscid flow data and a boundary-layer simulation that simulates fluid viscous effects.

9. The computer-implemented method of claim 1, wherein the aircraft surface is the surface of a wing.

10. A computer-implemented method of generating a fluid-flow simulation over a computer-generated aircraft surface, the surface comprised of a surface mesh of polygons, the method comprising:
   determining, using a computer, a pressure-gradient vector for a selected polygon, the selected polygon belonging to the surface mesh of polygons;
   defining a minimum diffusion rate along the direction of the pressure-gradient vector of the selected polygon;
   defining a maximum diffusion rate in a direction perpendicular to the direction of the pressure-gradient vector of the selected polygon;
   defining a diffusion-path vector from a point in the selected polygon to a neighboring point in a neighboring polygon, the neighboring polygon belonging to the surface mesh of polygons; and
   determining, using the computer, an updated fluid property for the selected polygon using a variable diffusion rate, the variable diffusion rate based on the minimum diffusion rate, maximum diffusion rate, and angular difference between the diffusion-path vector and the pressure-gradient vector.

11. A non-transitory computer-readable medium storing computer-readable instructions for generating a fluid-flow simulation over a computer-generated aircraft surface, the surface comprised of a surface mesh of polygons, the instructions performing a process comprising:
   obtaining a boundary-layer fluid property for a subset of the polygons of the surface mesh of polygons, the subset of polygons representing a portion of the computer-generated aircraft surface;
   determining a pressure-gradient vector for a selected polygon, the selected polygon belonging to the surface mesh of polygons but not one of the subset of polygons for which a boundary-layer fluid property has been obtained;
   defining a minimum diffusion rate along the direction of the pressure-gradient vector of the selected polygon;
   defining a maximum diffusion rate in a direction perpendicular to the direction of the pressure-gradient vector of the selected polygon;
   defining a diffusion-path vector from a point in the selected polygon to a neighboring point in a neighboring polygon, the neighboring polygon belonging to the subset of polygons for which a boundary-layer fluid property has been obtained; and
   determining an updated fluid property for the selected polygon using a variable diffusion rate, the variable diffusion rate based on the minimum diffusion rate, maximum diffusion rate, and angular difference between the diffusion-path vector and the pressure-gradient vector.

12. The computer-readable medium of claim 11, wherein the variable diffusion rate is equal to the square root of the sum of the square of the minimum diffusion rate times cosine theta and the square of the maximum diffusion rate times sine theta, wherein theta is the angle between the direction of the diffusion-path vector and the direction of the pressure-gradient vector.

13. The computer-readable medium of claim 11, wherein determining the updated fluid property for the selected polygon is performed using an explicit discretization comprising:
   determining a distance between the point in the selected polygon and the neighboring point in the neighboring polygon;
   determining a property difference between an initial fluid property of the selected polygon and a boundary-layer fluid property of the neighboring polygon; and
   determining an updated fluid property by adding the initial fluid property value to the variable diffusion rate multiplied by the property difference divided by the distance.

14. The computer-readable medium of claim 11, wherein determining the updated fluid property for the selected polygon is performed using an implicit discretization comprising:
   obtaining coefficient values for a coefficient matrix, the coefficient values based on discretized spatial derivatives associated with the surface mesh of polygons;
   determining a set of linear equations using the coefficient matrix, wherein each linear equation of the set of linear equations corresponds to a surface-mesh polygon of the surface mesh of polygons;
   determining an updated property value associated with the selected polygon by simultaneously solving the set of linear equations, the updated property value representing the boundary-layer fluid property of the selected polygon.

15. The computer-readable medium of claim 11, wherein the point in the selected polygon is a centroid of the selected polygon and the neighboring point in the neighboring polygon is a centroid of the neighboring polygon.

16. The computer-readable medium of claim 11, wherein the boundary-layer fluid property is a boundary-layer thickness value, the boundary-layer thickness value representing a distance from the aircraft surface where fluid viscous effects can be ignored.

17. The computer-readable medium of claim 11, wherein the boundary-layer fluid property is a transpiration flow vector, the transpiration flow vector having a direction and a rate of fluid flow originating from the aircraft surface so as to represent the presence of a boundary-layer fluid flow.

18. The computer-readable medium of claim 11, wherein obtaining the boundary-layer fluid property comprises:
   determining an inviscid fluid property for a set of fluid cells corresponding to the subset of the polygons using an inviscid fluid simulation that does not simulate fluid viscous effects; determining a boundary-layer prediction point for each polygon of the subset of the polygons; and
   determining a boundary-layer fluid property for each boundary-layer prediction point using inviscid flow data and a boundary-layer simulation that simulates fluid viscous effects.

19. The computer-readable medium of claim 11, wherein the aircraft surface is the surface of a wing.

20. A non-transitory computer-readable medium storing computer-readable instructions for generating a fluid-flow simulation over a computer-generated aircraft surface, the surface comprised of a surface mesh of polygons, the instructions performing a process comprising:
- determining a pressure-gradient vector for a selected polygon, the selected polygon belonging to the surface mesh of polygons;
- defining a minimum diffusion rate along the direction of the pressure-gradient vector of the selected polygon;
- defining a maximum diffusion rate in a direction perpendicular to the direction of the pressure-gradient vector of the selected polygon;
- defining a diffusion-path vector from a point in the selected polygon to a neighboring point in a neighboring polygon, the neighboring polygon belonging to the surface mesh of polygons; and
- determining an updated fluid property for the selected polygon using a variable diffusion rate, the variable diffusion rate based on the minimum diffusion rate, maximum diffusion rate, and angular difference between the diffusion-path vector and the pressure-gradient vector.

* * * * *